(12) United States Patent
Wikramaratna

(10) Patent No.: US 11,831,751 B2
(45) Date of Patent: Nov. 28, 2023

(54) ONE-TIME PAD GENERATION

(71) Applicant: REAMC Limited, Poole (GB)

(72) Inventor: Roy Silva Wikramaratna, Poole (GB)

(73) Assignee: REAMC Limited, Poole (GB)

( * ) Notice: Subject to any disclaimer, the term of this patent is extended or adjusted under 35 U.S.C. 154(b) by 0 days.

(21) Appl. No.: 17/795,632

(22) PCT Filed: Jan. 19, 2021

(86) PCT No.: PCT/EP2021/051006
§ 371 (c)(1),
(2) Date: Jul. 27, 2022

(87) PCT Pub. No.: WO2021/151717
PCT Pub. Date: Aug. 5, 2021

(65) Prior Publication Data
US 2023/0120668 A1 Apr. 20, 2023

(30) Foreign Application Priority Data
Jan. 28, 2020 (GB) .................................. 2001167

(51) Int. Cl.
*H04L 9/08* (2006.01)
*H04L 9/06* (2006.01)

(52) U.S. Cl.
CPC .......... *H04L 9/0668* (2013.01); *H04L 9/0869* (2013.01)

(58) Field of Classification Search
CPC ............................ H04L 9/0668; H04L 9/0869
See application file for complete search history.

(56) References Cited

U.S. PATENT DOCUMENTS

| 6,046,616 A * | 4/2000 | Chan ................. H03K 3/84 327/175 |
| 8,942,373 B2 * | 1/2015 | Liu ................. H04L 9/0656 380/28 |
| 9,172,698 B1 * | 10/2015 | Evans ................. H04L 63/0853 |
| 11,088,835 B1 * | 8/2021 | Wilbur ................. H04L 9/14 |
| 2014/0016778 A1 * | 1/2014 | Goettfert ................. H04L 9/0668 380/255 |

(Continued)

OTHER PUBLICATIONS

International Search Report and Written Opinion from International Patent Application No. PCT/EP2021/051006, dated Feb. 5, 2021.
(Continued)

*Primary Examiner* — Phy Anh T Vu
(74) *Attorney, Agent, or Firm* — Dergosits & Noah LLP; Todd A. Noah

(57) ABSTRACT

A computer-implemented method of generating a one-time pad for use in encryption, the method comprising: determining a seed sequence and an ordered set of initial values; and for each initial value, computing a sequence of terms, wherein each term of the sequence is computed by combining at least one other term of that sequence with at least one term of a previous one of the sequences using modular arithmetic, the previous sequence being the sequence generated for the previous initial value or, in the case of the first initial value, the seed sequence. Rather than using the final sequence as a direct basis for the one-time pad, one or more additional steps are taken to disrupt the final sequence, in order to improve the security of the method and the resulting one-time pad.

27 Claims, 6 Drawing Sheets

(56) References Cited

U.S. PATENT DOCUMENTS

2017/0302444 A1* 10/2017 Gillaspy ............... H04L 9/0668
2018/0205536 A1*  7/2018 Tomlinson ............ H04L 9/0643
2020/0328886 A1* 10/2020 Newton ................ H04L 9/0825

OTHER PUBLICATIONS

Ritter, Terry, "The Efficient Generation of Cryptographic Confusion Sequences," Cryptologia, Apr. 1, 1991, 15:2, United States Military Academy, West Point, NY, USA.
Wikramaratna, et al., "Theoretical and empirical convergence results for additive congruential random number generators," Journal of Computational and Applied Mathematics, 233:9, Mar. 1, 2010, pp. 2302-2311, Amsterdam, Netherlands.
O'Neill, Melissa, "PCG: A Family of Simple Fast Space-Efficient Statistically Good Algorithms for Random Number Generation," Harvey Mudd College Cimputer Sciene Department Technical Report, Sptember 4, 2021, available: https://www.pcg-random.org/pdf/hmc-cs-2014-0905.pdf.

* cited by examiner

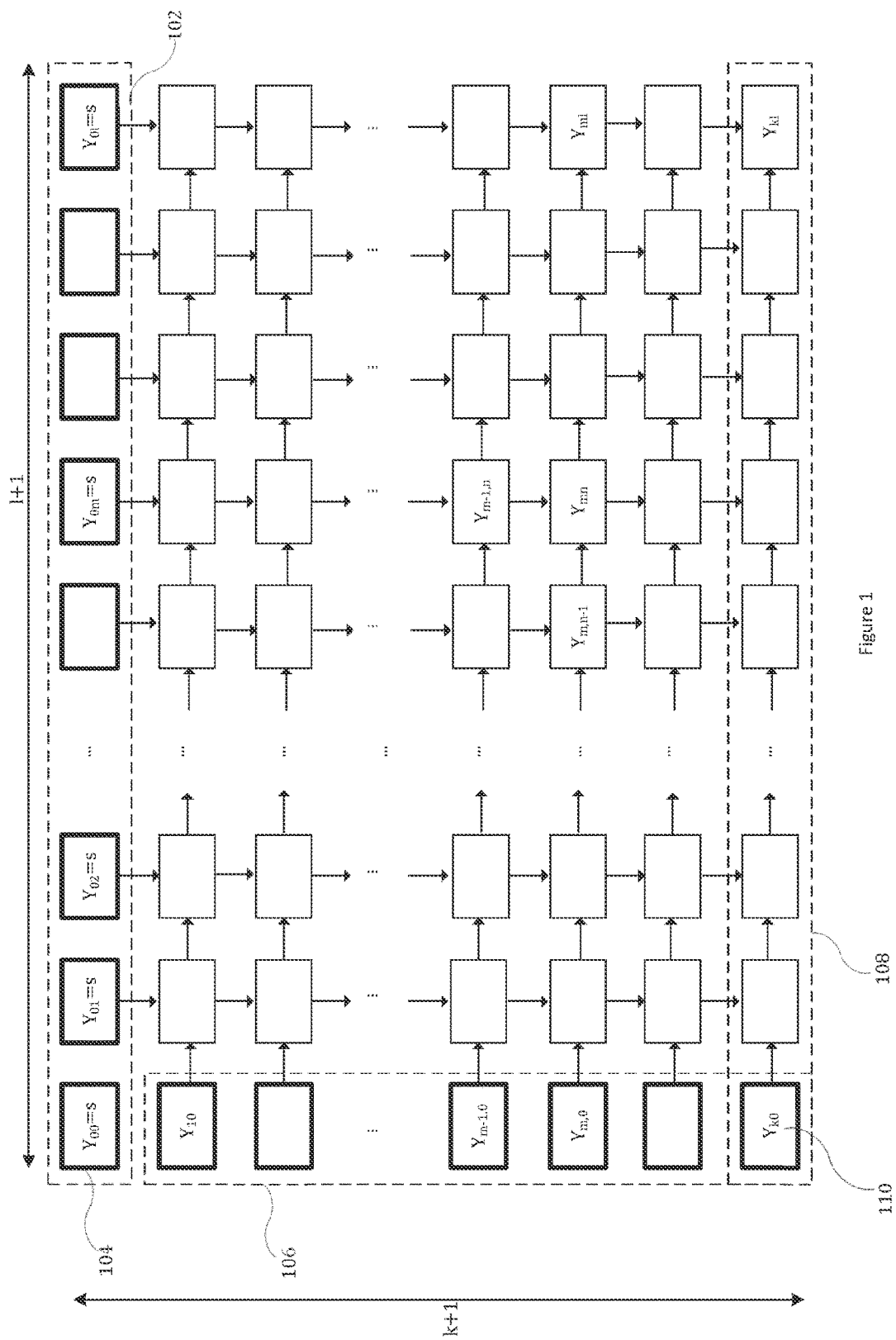

ONE-TIME PAD GENERATION

TECHNICAL FIELD

The present invention relates to the held of encryption, and particularly the generation of one-time pads and the use of such one-time pads to encrypt data.

BACKGROUND

Encryption of plaintext can be performed using the "One-Time Pad" (OTP). OTP is an encryption scheme that uses a single-use, pre-shared key that takes the form of a string of values (elements) such as characters or bits (the "key-stream"). Herein, the term "plaintext" means any sequence of symbols (e.g. bits, characters etc.) to be encrypted and does not imply any particular format, structure etc. of the plaintext. The term "message" may be used to refer to a piece of plaintext data to be encrypted, however, this terminology does not imply any particular context in which the encryption is performed (the message could be a piece of data to be sent over a communication channel but could equally be a piece of data that is encrypted for storage in memory, for example).

A plaintext message is encrypted by combining each symbol of the message with a corresponding element of the key-stream using modular addition. Modular addition is performed with respect to a modulus q and herein any two values a, b are said to be "modulo-summed" or "mod-q summed" as (a+b) mod q. In this technique, the symbols of the message and the elements of the one-time pad are represented as positive integers, and the first symbol of the message is modulo-summed with the first element of the one-time pad, the second symbol of the message with the second element of the one-time pad, and so on. This combining generates a new sequence of numbers (the "cyphertext" or "encrypted message/data"). In one implementation, each symbol of the message and each element of the one-time pad is a single bit, combined using XOR (the XOR of two bits is equivalent to the mod-2 addition of those, bits). As another example, each symbol/element could be a byte (8 bits) or "nibble" (4 bits), and more generally can be an integer of arbitrary length that may not be represented in binary. The ciphertext can be decrypted by inverting the method of combining the message and one-time pad. OTP is symmetric in that the same key is used for decryption and encryption.

OTP is provably unbreakable, in that the ciphertext will be impossible to decrypt, provided the key is "truly" random, at least as long as the plain text, never reused (even in part) and is kept completely secret, However, there are a number of problems around the practical use and generation of one-time pads. In particular, the need for "hue" randomness, and the consequent requirement to share a key at least as large as the message. This has limited the use of OTP to a relatively narrow set of applications, such as diplomatic and military communications.

Consistent with modern terminology, the terms "Vernam cipher" and "stream cipher" are used herein to refer to an encryption scheme in which the plaintext is combined with a keystream in the above manner (sometimes in the field of cryptography, the term Vernam cipher is used to specifically refers to a stream-cipher with bit-wise encryption using XOR; however, use of the term Vernam cipher herein does not imply that limitation, unless expressly indicated). With a Vernam cipher, the key may be random or pseudorandom.

SUMMARY

Herein, a method is provided that allows generation of a pseudo-random sequence using a very simple and fast algorithm—completely reproducible if the full initialisation is known—to generate a whole family of one-time pads that each work as effectively as a truly random one-time pad, and allows the key to be distributed or shared much more easily and securely than sharing the full content of the pad (by distributing the shorter initialization). The number of alternative one-time pads to choose from means that use of Vernam ciphers need no longer be restricted to critical communications and becomes practical for all applications ranging from critical military and diplomatic communications all the way to everyday communications which users wish to keep private.

Each one-time pad in the family corresponds to a unique initialization. The inventor of the present invention has performed extensive empirical testing of different initializations based on the TestU01 library, detailed below. TestU01 implements a suite of statistical tests for randomness.

In a first aspect of the present invention, a computer-implemented method of generating a one-time pad for use in encryption comprises: determining a seed sequence and an ordered set of initial values; for each initial value, computing a sequence of terms, wherein each term of the sequence is computed by combining at least one other term of that sequence with at least one term of a previous one of the sequences using modular arithmetic, the previous sequence being the sequence generated for the previous initial value or, in the case of the first initial value, the seed sequence; processing each term of a final one of the sequences, the final sequence being the sequence computed for the final initial value, to determine therefrom a reduced pseudorandom number having a smaller bit length than the processed term, thereby generating a sequence of reduced pseudorandom numbers; wherein the one-time pad. comprises or is derived from the sequence of reduced pseudo random numbers for encrypting a sequence of symbols by transforming each symbol of the sequence of symbols with a corresponding element of the one-time pad.

In a second aspect of the invention, a computer-implemented method of generating a one-time pad for use in encryption comprises: determining a seed sequence and an ordered set of initial values; for each initial value, computing a sequence of terms, wherein each term of the sequence is computed by combining at least one other term of that sequence with at least one terra of a previous one of the sequences using modular arithmetic, the previous sequence being the sequence generated for the previous initial value or, in the case of the first initial value, the seed sequence; and determining a reduced sequence of pseudorandom numbers by selectively discarding terms of a final one of the sequences which do not match any element of a defined alphabet, the final sequence being the sequence computed for the final initial value; wherein the one-time pad comprises or is derived from the reduced sequence of pseudo-random numbers for encrypting a sequence of symbols by transforming each term of the sequence of symbols with a corresponding component of the one-time pad.

The final sequence referred to above is pseudorandom, and may be referred to as a "full" pseudorandom sequence (or full "ACORN sequence"— see below). The testing based on the TestU01 library has demonstrated the effectiveness of the pseudorandom number generation steps for generating sequences that satisfy all the TestU01 tests, over a range of initializations. Analysis by the inventor has also demonstrated beneficial convergence properties of the resulting pseudorandom sequences and, when combined with the testing, this demonstrates the effectiveness of the overall method for generating sequences with strong cryptographic properties. This is discussed in further detail below.

Notwithstanding the above, the final sequence is not used as a direct basis for the one-time pad. Rather, the method additionally involves at least one of the "processing" step of the first aspect to reduce the bit length and the "selectively discarding" step of the second aspect. Both additional steps, whether performed individually or in combination, have the effect of destroying any linearity in the earlier steps that form the basis of pseudo-random number generation. This greatly increases the security of the one-time pad when used for the purposes of encryption. Preferred embodiments apply both steps in combination to maximize this disruptive effect, as in the examples described below.

It is noted that the terms "one-time pad" (lower case) and "OTP key" are used synonymously herein, and those terms encompass pseudorandom keystreams with strong cryptographic properties generated using the present techniques. An alphabet means a set of alpha numeric or other symbols of any length N which may be mapped onto the integers (0,1,2, . . . , N−1).

The size of the initial value set (i.e. the number of initial values) is referred to as the order of the method, and is denoted by k. The seed sequence and the ordered set of initial values constitute the initialization to the method. In the described embodiments, the seed sequence is defined by a single, repeating seed value. The full initialization is the seed value, the set of initial values, and a modulus M with respect to which the modular arithmetic is performed.

A one-time pad for use in encryption is also suitable for use in decryption, due to the symmetrical nature of OTP. The method encompasses the generation of one-time pads for both encryption and decryption.

In embodiments of the first aspect, each terms of the final sequence may be processed by sampling therefrom a subset of bits.

The subset of bits may consist of a predetermined number of leading bits of the sampled-from term, the remaining trailing bits of that term being discarded.

The sequence of reduced pseudorandom numbers may be a reduced sequence, determined by selectively discarding any of the reduced pseudorandom numbers which do not match any element of a defined alphabet, the one-time pad comprising or derived from the reduced sequence of reduced pseudorandom numbers. That is to say, the first and second aspects above may be used in combination, to both reduce the bit-length of each number and selectively discard terms outside of the alphabet.

In such embodiments, the alphabet may contain q elements, wherein only the p leading bits of each term of the final sequence are retained, where p=N+Int[$\log_2$ q] and N≥1.

In embodiments of the second aspect (including embodiments in which the first and second aspects are combined), each term of the final sequence may be processed to determine therefrom a reduced pseudorandom number having a smaller bit length than the processed term, wherein the reduced sequence contains only reduced pseudorandom numbers within the alphabet, with terms of the final sequence whose reduced pseudorandom numbers are outside of the alphabet being discarded.

At least nine initial values may be used, and the modular arithmetic may be performed with respect to a modulus of at least $2^{60}$, and preferably at least $2^{90}$, and more preferably at least $2^{120}$.

Generally, the security of the method increases with the size of the modulus. It is generally recommended to use a modulus of at least $2^{60}$, but it is emphasised that this is not a hard limit, and it may be possible to an acceptable level of security in certain practical situations with a smaller modulus (e.g. between $2^{30}$ and $2^{60}$).

The modulus may be a power of two or a power of a prime number other than two. As explained below, there are certain benefits to using a modulus that is a power of a prime, and particular benefits to a power of two modulus. However, this is not a requirement, and the method can be implemented with any suitable modulus, including composite moduli.

The modular arithmetic may be performed with respect to a modulus that is a power of two, and the seed sequence is defined by a seed value that is odd.

As one alternative the modulus may be a power of a prime other than two, and the seed sequence defined by a seed value which is not divisible by that prime (i.e. the seed is relatively prime with the modulus)

Alternatively, the modulus may be a composite modulus which has two or more different prime factors each of which may be raised to a possibly different power, and the seed sequence is not divisible by any of those prime factors (i.e. the seed is relatively prime with the modulus).

The seed sequence may be a repetition of a single seed value, and each term of each sequence for each initial value may be computed as the modular sum of the previous term or the same sequence, and the corresponding term of the previous sequence.

The method may comprise the step of using the one-time pad to encrypt a piece of data in the form of a sequence of symbols.

The method may comprise the step of using the one-time pad to decrypt a piece of data.

The encryption or decryption may be performed using modular arithmetic with respect to a modulus q, where q is the size of the alphabet, and is less than a modulus M with respect to which the sequences are computed.

Different, non-overlapping parts of the one-time pad may be used to encrypt different messages, wherein each encrypted message may be rendered available to a recipient with a marker denoting the part of the one-time part used to encrypt it.

Further aspects herein provide a computer system comprising one or more computers, programmed or otherwise-configured to carry out any of the above steps, and a computer program configured to program a programmable computer system to carry out the steps

BRIEF DESCRIPTION OF THE DRAWINGS

For a better understanding of the present invention and to show how the same may be carried into effect, reference will now be made by way of example to the following drawings.

FIG. 1 illustrates certain principles of an Additive Congruential Random Number (ACORN) generator;

DESCRIPTION

Figure 1A:
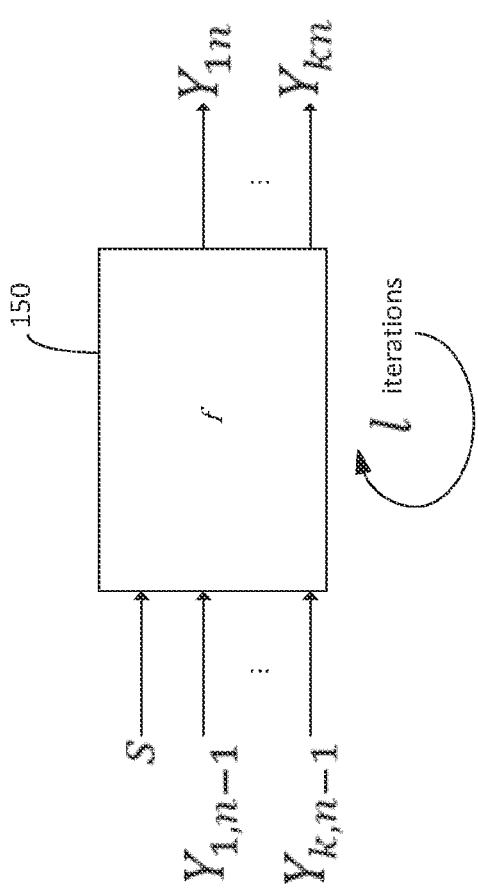
FIG. 1A is a schematic block diagram of an ACORN generator function.

The described embodiments of the invention make use of the "ACORN" (Additive Congruential Random Number) generator. ACORN generators are a robust family of pseudorandom number generators (PRNGs) which have been applied in geostatistical, oil reservoir modelling, and probabilistic risk assessment applications. Further details of the ACORN family may be found at http://acorn.wikramaratna.org/, the entire contents of which is incorporated herein by reference.

The present disclosure considers a novel application of ACORN generators to cryptography, and the viability of that application has been demonstrated through extensive empirical testing using the TestU01 library. This is described in detail below, but first details of the ACORN generator are described by way of context.

The method of generating the sequence of pseudo-random numbers is discussed in more detail below with reference to FIG. 1.

FIG. 1 uses rectangles to represent integer values and arrows to denote modular arithmetic. The values are arranged in a two-dimensional array, as this conveniently reflects the mathematical operations according to which the full set of values is derived. A seed value is denoted by reference numeral 104 and an ordered set of initial values is denoted by reference numeral 106 (shown as bold-outline rectangles). A seed sequence 102 is defined as a repetition of the seed value (i.e. every term in the seed sequence 102 equals the seed value 104). Each other depicted value is a value derived directly or indirectly from the seed value 104 and at least one of the initial values 106 using modular arithmetic. Each such value is shown to have two other values connected to it, which denotes the fact that this value is derived as the mod-M sum of those two other values, where M is a defined modulus. The modulus M, seed value 102 and set of initialization values 104 constitute the initialization of the ACORN generator.

A sequence of terms is generated for each initial value of the ordered set of initial values 106 (i.e. one sequence per initial value). The sequence generated for a given initial value is generated from that initial value in combination with the previous sequence, in the following manner.

In the following, the seed value 102 is denoted in mathematical notation as s and the set of initial values 106 is denoted in matrix notation as $(Y_{10}, \ldots Y_{k0})$, with k initial values in total. These are depicted in FIG. 1 as running vertically down the left-most column of values. The integer k is referred to as the "order" of the initialization. The seed sequence 102 is defined as $(Y_{00}, \ldots Y_{0l})$ with $Y_{0n} = s \, \forall \, 0 \le n \le l,$ where l+1 is a sequence length. The ACORN generator can generate sequences of any desired sequence length (see below). The seed sequence 102 is shown running horizontally across the top-most row in FIG. 1.

Each derived value is defined as $$Y_{mn} = (Y_{m-1,n} + Y_{m,n-1}) \bmod M, \quad (1)$$

for $0 \le m \le k$ and $0 \le n \le l$ where the l can be as large as desired. In the cryptography application described below, l will be determined by the length of the one-time pad that is required in a given context.

Regarding notation, in the ACORN literature, the notation $Y^m_n$ is used in place of $Y_{mn}$. Herein, $Y^m_n$, $Y_{mn}$ and $Y_{m,n}$ are synonymous (the "$Y_{m,n}$" form is used where helpful to avoid ambiguity). The notation $Y^m_n$ is also used in Annex B of this description.

Under this definition, a sequence $(Y_{m0}, \ldots, Y_{ml})$ of length l+1 is computed for each initial value $Y_{m0}$. Each such sequence is referred to as a "derived sequence" or "ACORN sequence" to distinguish from the seed sequence 102. The first value of each derived sequence is the corresponding initial value. Expressed in words, it can be seen from Equation (1) that each subsequent (derived) value $Y_{mn}$ of each derived sequence is defined as the mod-M sum of the n-1$^{th}$ value, of the same sequence and the n$^{th}$ value, $Y_{m-1,n}$, of the previous sequence (i.e. the sequence computed for the previous initial value $Y_{m-1}$ for m>1 or, in the case of m=1, the seed sequence 102).

A "final" sequence $(Y_{k0}, \ldots, Y_{kl})$, denoted by reference numeral 108, is computed for the final initial value $Y_{k0}$ (reference numeral 110), which is shown as the bottom-most row in FIG. 1.

A novel application of the ACORN generator to cryptography will now be described, in which the final sequence 110 forms the basis of a one-time pad (that is, a keystream).

As depicted in FIG. 1A, the ACORN generator can be implemented as a function f, denoted by reference numeral 150, where:

$$f(s, Y_{1,n-1}, \ldots, Y_{k,n-1}) = (Y_{1n}, \ldots, Y_{kn}). \quad (2)$$

That is, as a function f applied to the seed s and the n−1$^{th}$ column of values (i.e. the column containing value n−1 of every derived sequence), in order to return the n$^{th}$ column of values (i.e. the n$^{th}$ value of every derived sequence) in accordance with Equation (1). In order to generate sequences of arbitrary length l+1, the ACORN generator f is called l times, starting with the initial values $(Y_{10}, \ldots, Y_{k0})$.

The value $Y_{kn}$ of the final sequence is a pseudorandom number (prn), and is the part of the ACORN output that is used as a basis for one-time pad generation, as will now be described.

Figure 2:
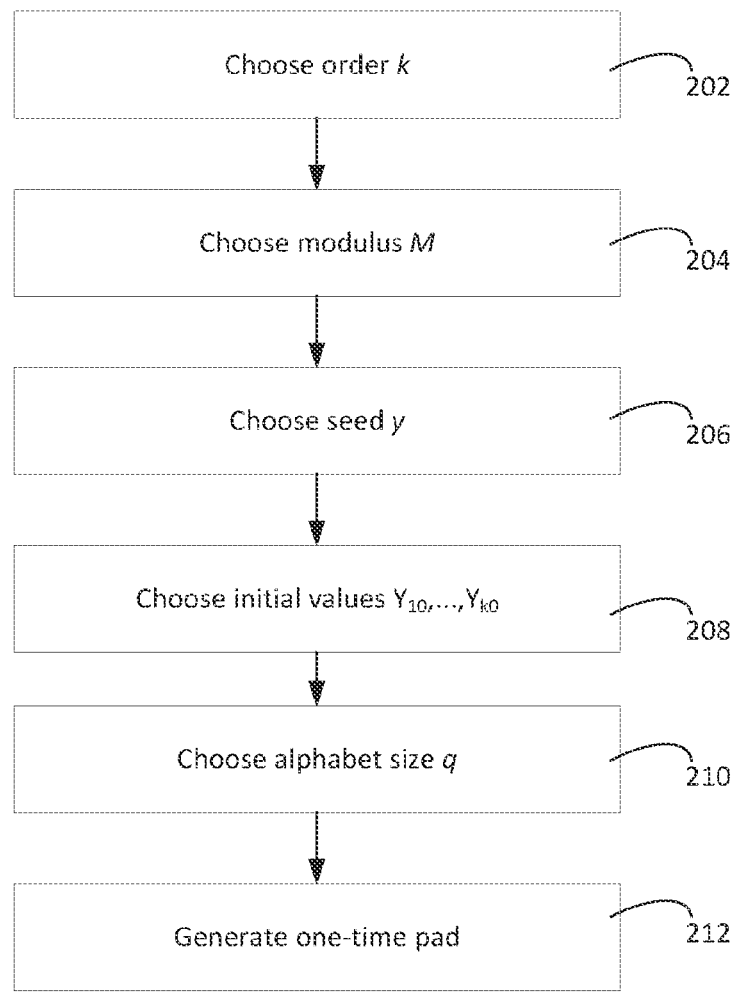
FIG. 2 shows a flowchart for a method of generating a one-time pad.

FIG. 2 shows a flowchart for a method of generating a one-time pad using the ACORN generator. The method adopts certain parameter choices, and the reasons for these choices are elaborated on below.

Certain aspects of the method are optimized for efficient implementation on a 32-bit computing platform, e.g. formed of one or more 32-bit CPUs (central processing unit). A 32-bit architecture operates on units of data having a size of 32 bits. However, as will be appreciated, those aspects of the method can be readily adapted for implementation on other computer architectures, such as a 64-bit architecture (or 128 bit, or larger, if such hardware were available), in accordance with the general teaching presented herein.

One example of a 32-bit implementation uses two integer words to represent integers up to $2^{60}$ (with modulus $M=2^{60}$) or four integer words to represent integers up to $2^{120}$ (with modulus $M=2^{120}$). As will be appreciated, a larger modulus becomes easier to implement on 64-bit (or higher) architecture using 64-bit (or higher) integers.

A 32-bit integer can store integers up to $2^{31}-1$ without overflow (the final bit is generally interpreted as a plus or a minus). Working in modulo $2^{30}$ makes it possible to add two such integers plus one (from a carry) without exceeding $2^{31}-1$ and getting an overflow. With 64-bit integers, it is possible to work with modulus up to $2^{62}$ but it is convenient to limit to modulus $2^{60}$ because it maintains a straightforward mapping between the 32-bit and 64-bit implementations. As will be appreciated, this is merely one example of convenient implementation, the present disclosure is not limited in this respect.

At Step 202, an order k for the generator is selected, where k is at least 9—to ensure the random nature of the resulting pad (see below).

At Step 204, a modulus M for the generator is selected. A suitable value is $M=2^{120}$ and that is the value adopted in the following. However, a larger power of 2 may be used, with minor modifications to the method. It is convenient, but by no means essential, to work with a modulus that is power of two. Considerations around the choice of modulus are discussed in further detail below —see, in particular, the section entitled "Periodicity and randomness".

At Step 206, a value of the seed s is selected as an odd integer between 1 and M−1. A value of s is chosen to satisfy conditions set out below (see Empirical Testing, below) as follows. For modulus $M=2^{120}$, the seed is specified by four non-negative integer values, each strictly less than $2^{30}$ such that $$s=(2^{90})s_1+(2^{60})s_2+(2^{30})s_3+s_4$$

where $s_1$, $s_2$ and $s_3$ are each not equal to either 0 or $2^{30}-1$ (i.e. their binary representations are. not all zeroes or all ones) and $s_4$ takes an odd value; modulus $M=2^{120}$ gives more than $2^{110}$ values to choose from (the exact number is $(2^{30}-1)(2^{30}-1)(2^{29})$.

The seed value 104 is an integer value greater than zero and less than the modulus. An odd seed value is chosen because the modulus in this example is even. More generally, that seed value s and modulus M are relatively prime. That is, the two values have no prime factors in common. For a modulus that is equal to a power of 2, the seed value 104 may conveniently take any odd value. However, the more general considerations pertaining to the selection of the modulus are discussed below, in the "Periodicity and randomness" section.

With the above formulation, an acceptable seed s may be obtained under the following conditions:

1. $s_1$, $s_2$, $s_3$ and $s_4$ are all strictly less than $2^{30}$,
2. The binary representations of $s_1$, $s_2$ and $s_3$ are each not all zeroes and not all ones, and
3. $s_4$ is odd.

The above conditions have been determined for modulus $M=2^{120}$ and are supported through empirical testing with TestU01, as detailed below. More generally, an acceptable seed may be determined through empirical randomness testing of the final ACORN sequence 108, for any choice of modulus.

At Step 208, k initial values are selected, $(Y_{10}, \ldots, Y_{k0})$. The initial values can be assigned arbitrarily, though it may be convenient to select each initial value $Y_{n0}$ so that it is approximately uniformly random between 0 and M−1. Any appropriate method can be used to generate the initial values 106. In theory, one could toss a coin 120 times for each initial value—which means 120 k times in all—and assign each bit 0 or 1 according to the outcome of the toss. A more practical implementation can apply any appropriate PRNG (which aright be a different ACORN generator or an arbitrary different PRNG) to generate k strings of 120 zeros and ones and assign the initial values accordingly. Note that the method used to assign the initial values need not be cryptographically strong per se, nor is it actually a requirement for the initial values to be uniformly distributed. It may be convenient, but not essential, to assign them uniformly at random (rather than, say, zeroes) as it makes exhaustive testing even more onerous for an attacker who may try to break the encryption scheme.

The encryption scheme is defined with respect to an "alphabet" of size a. A message to be encrypted should be made up entirely of symbols belonging to the alphabet (which defined a symbols in total). That is, all characters appearing in the plaintext must also appear in the alphabet; however, it is not a requirement that all characters in the alphabet need appear in the message. By way of example, the following alphabets are considered (but any suitable alphabet can be chosen in any given context):

i. To encrypt a binary file, the alphabet would consist of [0,1]
ii. To encrypt a hexadecimal file, the alphabet would consist of [0,1,2,3,4,5,6,7,8,9,10,11,12,13,14,15]
iii. To encrypt an alphanumeric file, the alphabet might consist of [a,b,c,d,e,f,g,h,i,j,k,l, . . . , A,B,C,D, . . . , 0,1,2,3,4,5,6,7,8,9]; it could also be extended to include standard punctuation, for example ";" any other punctuation in the message but not included in the alphabet can also be handled by replacing the punctuation by a recognizable string before encryption (for example if % and & are included in the alphabet, any punctuation mark could be represented as "% string&" where "string" is a description of the punctuation mark and "%" and "&" are used exclusively as markers for non-standard punctuation; e.g. "%" could be replaced by "% percent&"; — could be replaced by "% ampersand&"; if ">" is not in the alphabet it could for example be replaced by "% greater than&").

The one-time pad used to encrypt the message is made up of elements restricted to the same alphabet, and those values should be uniformly distributed within the one-time pad in that every symbol in the alphabet should appear with approximately equal probability in the one-time pad, independently of any other element of the one-time pad. Approximate uniformity should also be exhibited in any section of the one-time pad, regardless of the length of the section chosen (analogous to a pad generated from a truly random uniform sequence).

At Step 210, an alphabet of q different values is chosen. Whatever values are chosen, an integer representation is adopted, whereby the q values of the alphabet are represented by the integers [0, q−1] it is useful to define p=1+Int[$\log_2$ q], where Int[·] denotes the integer part of the operand [n·], This should ensure that $2^p-1 \leq q < 2^p$.

Figure 2A:
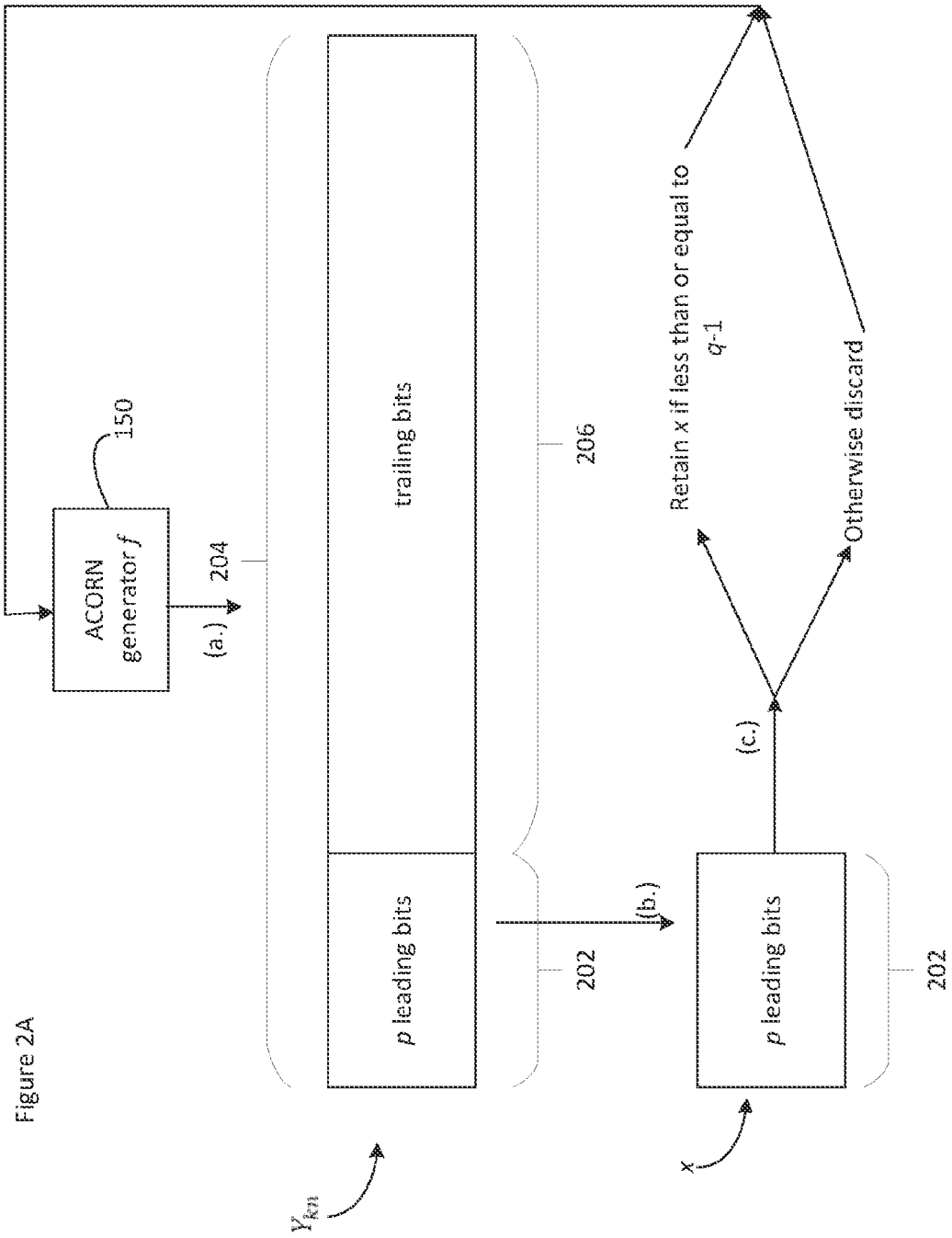
FIG. 2A schematically illustrates an iterative algorithm for generating a one-time pad once an initialization has been chosen.
Figure 2B:
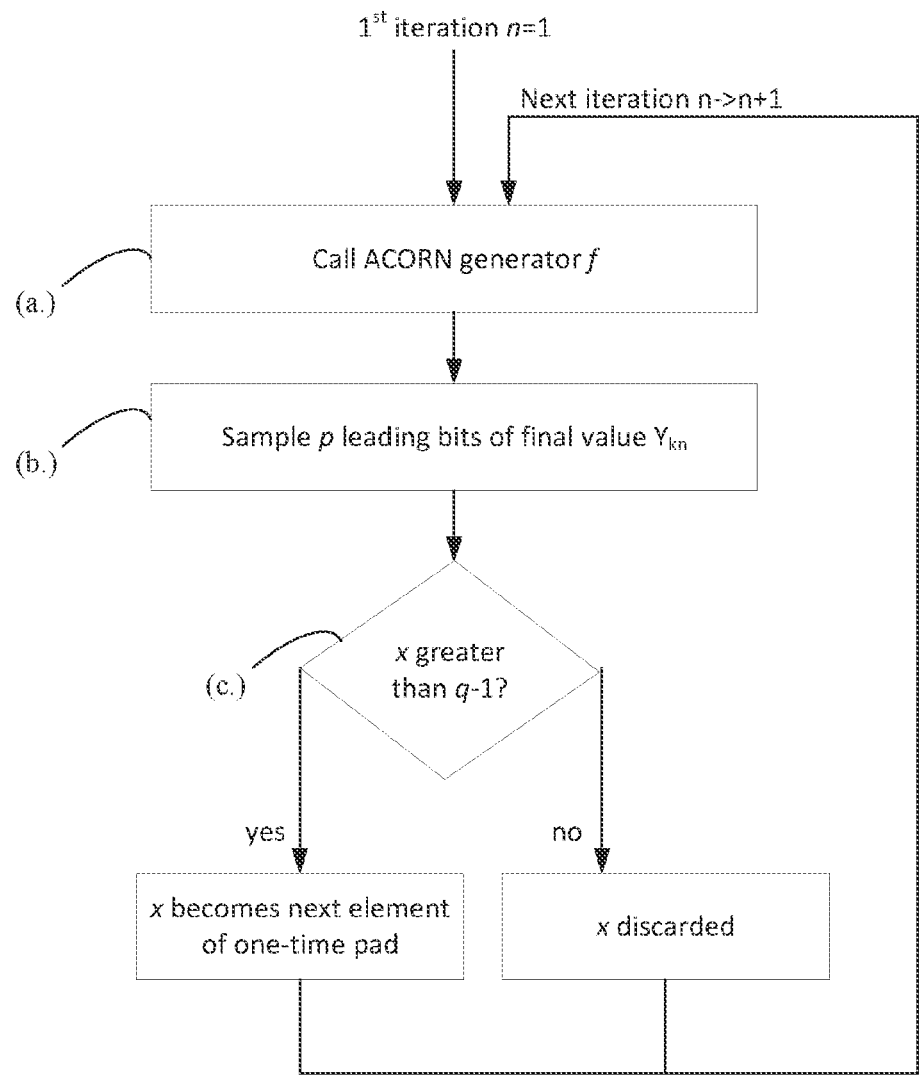
FIG. 2B shows a flowchart for the algorithm.

At step 212, a one-time pad is generated via an iterative algorithm, and each iteration proceeds as follows. Operations (a.) to (c.) below are depicted schematically in FIG. 2A, and a flowchart, of the operations is shown in FIG. 2B. The operations are repeated until a one-time pad of sufficient length has been generated (see below), starting with the first iteration n=1.

(a.) Call the ACORN generator 150, as per Equation (2), using the chosen initialization to give an integer in the range [0, M−1]. This integer is denoted by reference numeral 204 and is the vane $Y_{kn}$, i.e. the $n^{th}$ value of the final derived sequence 108, as computed in the $n^{th}$ iteration.

(b.) Divide the result $Y_{kn}$ by ($M/2^p$) and take the integer part, to give an integer x in the range 0 to $2^p-1$. This is equivalent to retaining (sampling) only the p leading bits of $Y_{kn}$ (denoted by reference numeral 202), and discarding the remaining trailing bits (denoted by reference numeral 206). This is one form of "size reduction" operation, which reduces the value $Y_{kn}$ (of bit length $\log_2$ M) to a typically much smaller integer x (of bit length p).

(c.) If x is less than or equal to q−1, output x as the next element of the one-time pad; else if x is greater than or equal to q, discard the value x. The effect of this is to discard any value of x that is outside of the alphabet. The algorithm then returns to (a), commencing the next iteration n+1.

The result x obtained in step (b.) is an example of a "reduced" pseudorandom number as that term is used herein—"reduced" in the sense of having a shorter bit length than the term $Y_{kn}$ from which it is derived, and derived in a way that preserves pseudo-randomness, The effect of discarding terms outside the alphabet in step (c.) is to compute a "reduced" sequence—"reduced" in that the resulting sequence is shorter than the sequence that would be obtained if all terms were retained. For example, in the case that $p=1+\text{Int}[\log_2 q]$ then, if q is a power of 2, $q=2^{p-1}$ and approximately half the terms will be discarded. This is merely an illustrative example, and there is no requirement for q to be a power of two. The techniques can be implemented with any suitable size of alphabet.

More generally, p could be defined as $p=N+\text{Int}[\log_2 q]$ where N is a relatively small integer greater than or equal to 1. Increasing N means discarding a greater number of terms.

The overall effect of (b.) and (c.) is therefore to provide a reduced sequence of reduced pseudorandom numbers. Note that discarding any x value outside of the alphabet amounts to discarding any term $Y_{kn}$ of the final sequence which does not match any term of the alphabet (in the sense that the p leading bits of that term $Y_{kn}$ does not match any element of the alphabet). The operations performed at step (c.) therefore amount to selectively discarding terms of the final sequence 108 that do not match any element of the alphabet.

The seed s and the initial values $(Y_{10}, \ldots, Y_{k0})$ selected in steps 202 to 208 are the "secret information" underpinning the encryption method. Rather than sharing/distributing the (potentially much larger) one-time pad, this secret information can be shared between any two or more parties who wish to communicate securely (i.e. the seed and the initial values may act as a shared secret between the parties, with each party deriving separately an instance of the one-time pad for the purpose of message encryption/description), or held by a single party in a non-communication context (e.g. a single party who encrypts and stored a message for later decryption by the same party).

The secret information allows the pad to be very easily reproduced assuming the alphabet and the modulus M are known. There is no particular requirement for the alphabet or the modulus M to be secret. Indeed, the alphabet can be determined from analysis of a sufficiently long cyphertext, and this is in no way detrimental to the security of the method. The modulus does not need to be kept secret to maintain secrecy of the encryption method. However, keeping the modulus secret would increase the security even further.

Without knowing the secret information, it is impossible to derive the secret information in a realistic period of time from a section of the one-time pad, irrespective of the length of the section available. The only way of deriving the secret information is by exhaustive testing of the possible secret information and the number of available alternative choices make this impossible with current computer hardware (even allowing for the speedup that may be obtained with quantum computers).

The method scales effectively to larger modulus increasing modulus e.g. from $2^{120}$ to $2^{240}$ is straightforward, and the only impact is a factor 2 increase in the pad generation time; by contrast, the resulting exhaustive search time will increase by a factor in excess of $2^{120}$—so the approach is future-proofed against all conceivable future computing hardware improvements.

In order to encrypt different messages, different sections of the same one-time pad can be used, provided that no section of the one-time pad is ever re-used (even in part).

Analysis of resulting one-time pads:

To illustrate the suitability of the above method to cryptography, some relevant analysis will now be provided.

The resulting one-time pad will eventually start to repeat itself, but has period length significantly greater than $2^{110}$, i.e. no such repetition will occur until the one-time pad has reached a length significantly greater than $2^{110}$. The inventor's analysis indicates the period to be $2^{123}$ for modulus $2^{120}$ and order 9 (for a more general discussion, see the "Periodicity and randomness" section. Before exhausting the period (i.e. reaching a length greater than the period), the one-time pad appears random and each term in the alphabet appears with approximately equal probability.

The total amount of data that can be encrypted using a single one-time pad (i.e. as generated from a single seed and a single set of initial values) is limited by the period of the one-time pad, as a consequence of the restriction on re-using any section of the one-time pad. However, the same one-time pad can be used to encrypt well in excess of $2^{110}$ data symbols, before a new set of secret information is required. This is a theoretical limit, as with a period in excess of $2^{110}$, it is impossible to exhaust the period in any practically conceivable period of time (for example, even generating $10^9$ or $\sim 2^{20}$ prn per second, it will take 2.5 centuries to generate $2^{60}$ prns, more than $3\times 10^5$ million years to generate $2^{90}$ ... and effectively eternity to generate $2^{120}$ prns and/or to exhaust the available period of $2^{123}$.

A starting point in the pad for any particular message can be specified relative to the first value in the pad, counting front the start of the pad. The key point about a one-time pad is that one should never reuse a "page" (part) that has already been used. A party using the pad for encryption needs to keep track of any part of the pad that has already been used, and ensure that the next usage starts beyond the last entry that has already been used by them.

The party using the pad for encryption needs to share the order k, the modulus M, the seed s, the k initial values (all the preceding parameters can be shared once at the start of the process) and also the starting point in the pad (different for each particular message—and this can be shared at the same time as the message) with the party who is to use the pad for decryption.

The method provides a sufficient number of one-time pads to use a different pad for communication between every pair of computers currently in existence and still only use a miniscule proportion of the possible one-time pads that could be generated.

Assuming there to be some 7 billion people in the world today (8 billion $\sim 2^{33}$); hence some $2^{66}$ pairs of individuals. The proposed algorithm could generate a different one-time pad for every pair of people in the world, and no two pairs of people would need to use the same pad. A similar analysis could be applied to pairs of devices (including PCs, phones, and other electronic communications devices).

The method provides more than $2^{110}$ one-time pads (in fact there are inure than $2^{110}$ different seeds to choose from, and each choice of seed gives rise to many, many different one-time pads. The actual number is expected to exceed $2^{1000}$ in practice for a modulus of $2^{120}$. For any given order and modulus, the actual number is expected to be have magnitude approximating to k×M).

The one-time pads as generated above can be used for example in a Vernam cypher without compromising security of the messages. It has been believed up to now that using a software method to generate the pads is inherently insecure because it allows the possibility of an attacker being able to recreate the pad given knowledge of a sufficiently long section of the pad. The proposed method is resistant to such attacks, because of the huge number of different initialisations that are possible, and because the algorithm turns out to be inherently not susceptible to reverse-engineering the "secret information" from the contents of the pad.

Basing the one-time pads on the ACORN algorithm means that existing theoretical results concerning k-dimensional uniformity that already exist can be applied to the resulting one-time pads. Use of the ACORN algorithm allows very fast encryption/decryption; the method proposed guarantees security.

If k+1 consecutive terms from the ACORN sequences— i.e. the values $Y_{kn}, Y_{k,n+1}, \ldots, Y_{k,n+k} \ldots$ are known to full accuracy, then it is possible to reconstruct the entire ACORN sequence. Were the final ACORN sequence 108 to be used as a direct basis for the one-time pad, this underlying linearity of the ACORN method could be a potential source of weakness. However, this is avoided, as the linearity is effectively removed by the additional processing steps: the first part of the proposed method, i.e. step (b.) above, only uses a small number of high-order bits from each pin $Y_{kn}$; the second part, i.e. step (c.), removes any resulting pills outside a specified range. Thus, the one-time pad only gives part of each of a selection of the numbers in the ACORN sequence, and there is no way of telling which numbers have been skipped (since no information is provided about them in the pad). This combination of two methods completely destroys the linearity of the underlying ACORN algorithm and ensures the process is not reversible. This is true even if the modulus M and the alphabet are known to an attacker.

Although it is considered preferable to apply both step (b.) and step (c.), either one of those steps, without the other, is sufficient to destroy the linearity of ACORN, and thus achieve the desired effect. Hence, in general, one or both of steps (b.) and (c.) may be applied.

Empirical Testing

Testing with TestU01

Extensive testing demonstrates that almost every choice of initialisation will give a sequence that passes all the TestU01 tests, provided the order k is sufficiently large (nine or greater) and the modulus a sufficiently large power of 2—testing has been performed with modulus of $2^{120}$, and this has been demonstrated to be sufficiently large to consistently pass all TestU01 tests. However, it is expected that sufficient randomness can be obtained with a smaller modulus. In general, the strength of the PRNG increases with the size of the modulus, and the level of strength required may be application specific (e.g. a larger modulus may he favoured in high-security applications such as diplomatic of military applications)

The inventor's tests have indicated that more than $2^{110}$ seeds (out of a total $2^{120}$ possible seeds) will consistently pass all the tests, assuming an odd seed s and all initial values set to zero. A significant proportion of the remaining seeds may well also pass all the tests, but they also include certain seeds that may give rise to failures— hence these other choices of seed are better avoided unless they have been individually tested. Note that $2^{110}$ is a conservative estimate—it is expected that the total number of viable seeds will, in fact, be closer to $2^{120}$.

Those tests have also indicated that, for these choices of seed, (almost) every initialisation will give a sequence that passes all the TestU01 tests; as an example, for order 9, this gives) $(2^{120})^9 = 2^{1088}$ different choices of initial values for each seed, with each sequence of period $2^{12}$, implying $2^{965}$ possible sequences to choose from for each choice of seed. For larger values of the order there are correspondingly greater numbers of sequences to choose from.

In more formal terms, the tests performed by the inventors support the following conjectures, where as defined previously, for modulus $M=2^{120}$, the seed is specified by four non-negative integer values, each strictly less than $2^{30}$ such that $$s=(2^{90})s_1+(2^{60})s_2+(2^{30})s_3+s_4$$

Then:

Conjecture 1. For order k at least 9 and modulus $2^{120}$, a sufficient condition for the resulting ACORN sequence to pass all the TestU01 tests is that $s_1$, $s_2$ and $s_3$ are each not equal to either zero or $(2^{30}-1)$ which means their binary representations are not all zeroes or all ones—and $s_4$ takes an odd value. Initial values are assumed to be all equal to zero.

Conjecture 2. If seed, order and modulus satisfy the conditions for Conjecture 1, and initial values are assigned arbitrarily, then resulting ACORN sequence will pass all the TestU01 tests.

The results of the supporting tests for Conjecture 1 are summarized in Table 1 and Table 2 of "Annex A". Conjecture 2 is supported by the results of the supporting tests for Conjecture 1, combined with the observation that for any choice of seed using non-zero initial values give rise to sequences that perform as well as (or better than) the sequence generated using the same seed and initial values all set to zero.

Table 1 summarises results from a first set of cases. The first number in each cell shows the number of failures while the second number (in brackets) shows the number of 'suspect values'.

Following L'Ecuyer and Simard, a 'failure' is defined to be an individual test with a p-value less than or equal to $10^{-10}$ or greater than or equal to $(1-10^{-10})$ and a 'suspect value' to be an individual test with p-value less than or equal to $10^{-4}$ or greater than or equal to $(1-10^{-4})$.

Cases M100x do not satisfy the conditions for Conjecture 1 (apart from M1005, which does satisfy the conditions). Some cases result in one or more failures on TestU01.

Cases M101x have been assigned seed values selected arbitrarily but which do satisfy all the conditions. All cases have zero failures; a small proportion have one or two suspect values but this is to be expected even with a truly random sequence.

Cases M105x, M106x, M107x and M108x have just one non-zero bit in the binary representations of s1, s2 and s3 and no more than two non-zero bits in the binary representation of s4 (i.e. they just satisfy the conditions of the conjecture). All cases have zero failures; a small proportion have one or two suspect values but this is to be expected even with a truly random sequence.

Table 2 summarises results obtained to date (as at January 2020) from a second set of cases. As in Table 1, the first number in each cell shows the number of failures while the second number (in brackets) shows the number of suspect values.

The seed for Case N10xx is chosen such that seed values for Case N10xx and Case M10xx sum in each case to $2^{120}$. This means that ones and zeroes are switched in the binary representations except. for the last binary digit which is one in each case. The resulting sequences (after scaling to the unit interval) will always sum to 1.

The result of testing on Case N10xx is expected to be virtually identical to the corresponding case M10xx, and this is indeed the case. There is some small variation in the occurrence of suspect values but corresponding cases always either pass all the tests or have almost identical numbers of failures.

The results included in Tables 1 and 2 cover generators with order up to 25. Further testing has been undertaken with larger order generators, up to order 100 and more. The results for the larger order generators appear very similar to those already included in the Tables 1 and 2 for order between 15 and 25.

Periodicity and Randomness

As noted above, whilst it is convenient to choose a modulus that is a power of two, it is not essential to do so. Two considerations pertaining to the choice of modulus are (a) the periodicity of the resulting sequences (a long period is desirable for the reasons discussed above) and (b) randomness of the resulting sequences.

With regards to periodicity, "Annex B" sets out a proof of periodicity for any choice of modulus. in brief, this proves the period of the resulting ACORN sequences to increase with the size of the modulus in accordance with "THEOREM 1" of Annex B. The theorem is proved for any arbitrary modulus expressed as a composite of prime powers:

$$M = \prod_{r=1}^{s}(q_r)^{t_r},$$

where each $q_r$ is a different prime. With a modulus that is a prime power, this reduces to $M=q_1^{t_1}$, and in the above examples of $M=2^{120}$, $q_1=2$ and $t_1=120$. With modulus of $2^{120}$ and k=9, the period length of $2^{123}$ mentioned above follows from equation (11) and (12) of Annex B.

However, the proof of periodicity holds for any choice of modulus (both prime powers and composite). A composite modulus gives longer period length, but may give poorer randomness properties in certain circumstances; in particular choosing the modulus to he multiple of different primes (each to power one) gives maximal period but poor randomness (some failures on specific tests with TestU01). This can, however, be avoided by ensuring that at least one prime factor of a composite modulus is sufficiently large, i.e. that $q_r$ is large for at least one r (unwanted structure in the final result can arise from the use of a composite modulus where no individual prime factor is raised to a sufficiently large power, even if the modulus itself is large).

With regards to the requirement for randomness, ACORN generators have been proved to have good convergence properties for power of two modulus. See R. S. Wikramaratna, "Theoretical and Empirical Convergence Results for Additive Congruential Random Number Generators", *J. Comput. Appl. Math.*, 233, pp 2302-2311, 2010, which is incorporated herein by reference in its entirety. The results demonstrate convergence in that, for any sufficient value of the order, the resulting sequences will be longer and better approximate to 'random, uniformly distributed on the unit interval' as the modulus takes increasing powers of 2.

Hence, another benefit of using powers of two is that convergence has already been demonstrated for powers of two. Hence, for a power of two modulus, as the size of the modulus increases, it is known that both that the period will increase (as the more general periodicity theorem applies) and that the randomness will increase (by virtue of the known convergence results), without needing further verification. In a practical implementation, it may, therefore, be most convenient to choose a power of two modulus that is sufficiently large to achieve a desired period.

However, it is emphasised that the methodology is not limited in this respect. Although the above convergence results apply to a modulus of power two, different forms of modulus (such as powers of other primes, e.g. 3, 5 etc. or composite moduli) may be equally viable. Whether or not any given modulus provides sufficient randomness can be verified through empirical testing. For example, such testing has indicated that a modulus equal to r! (r factorial) for a sufficiently large r also yields acceptable results.

Example Application—Secure Communications

Figure 3:
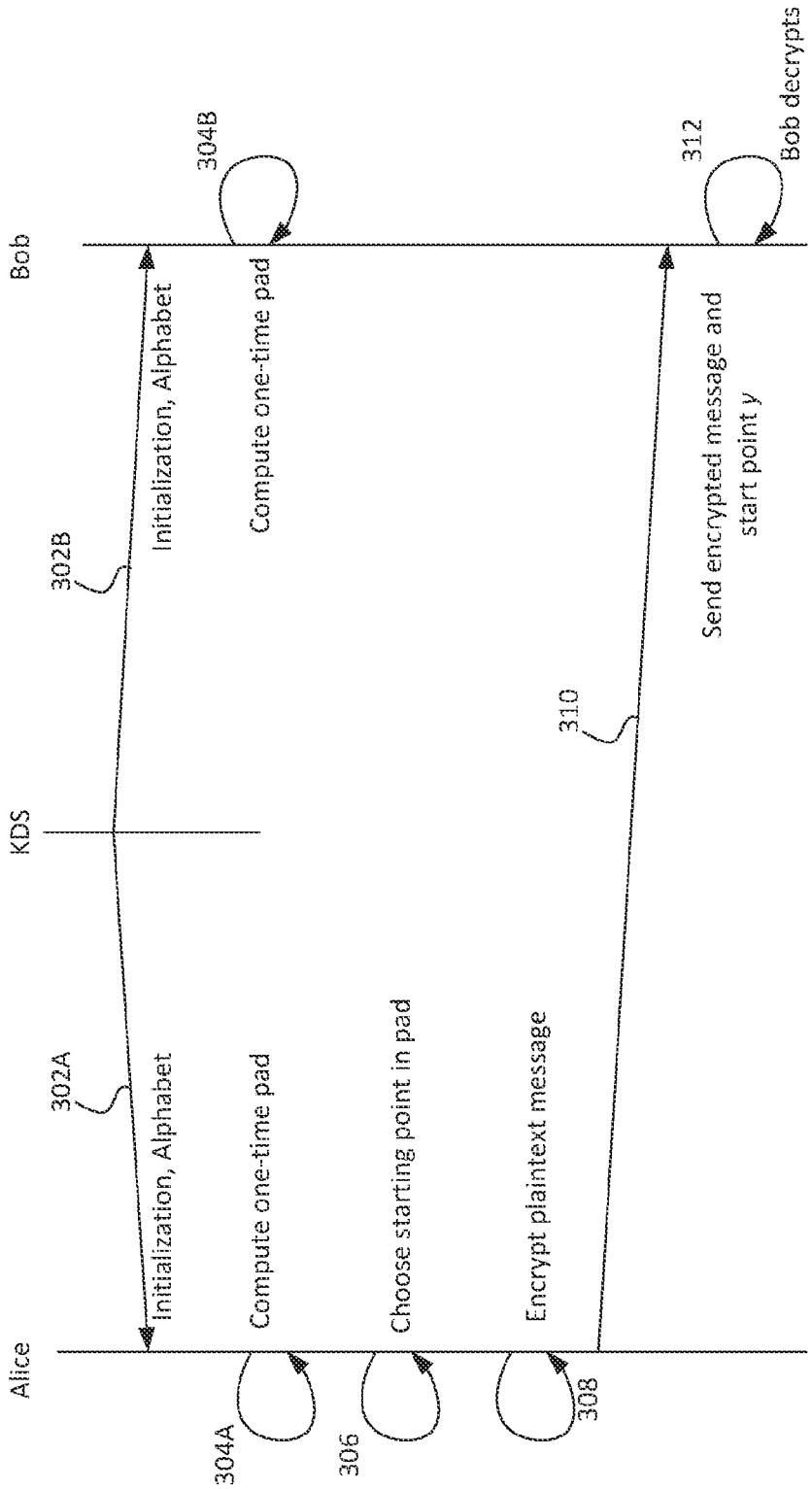
FIG. 3 shows a signalling diagram for a method of secure communication using a one-time pad.

FIG. 3 shows a signalling diagram for an example method proposed for secure encryption of any text or binary file. The method considers two parties, Alice (encrypting party) and Bob (decrypting party).

A key distribution service (KDS) has the role of determining the initialization, and distributing it to Alice and Bob. The KDS could be a trusted "third party", but the role of the KDS could also be assumed by Alice or Bob, who distributes the necessary information to the other, i.e. the described function of the KDS could be performed by Alice, Bob or a third party. Whilst described in relation to two parties, the description applied to any two or more parties who wish to communicate securely.

The initialization and the alphabet are rendered available to Alice and Bob at steps 302A and 302B respectively. This means sharing the order k, the modulus M, the seed s, the k initial values and the size and contents of the alphabet between all parties. This information can be shared by any appropriate secure method and could be done off-line (e.g. agreed in advance, or shared using a secure route or an agreed method); it should not be shared further with anybody else.

At steps 304A and 304B respectively, Alice and Bob separately compute one-time pads using the shared initialization and alphabet, by applying the above steps. Because of the reproducibility of the method, those one-time pads will be identical.

At step 306, Alice chooses a starting point y in the pad to he used for the current message. This can be the start of the one-time pad for the first message encrypted with the one-time pad, but for any subsequent message, the starting point y should be beyond the last point already used.

At step 308, Alice encrypts a message to be sent to Bob using the one-time pad and the determined start point y: Alice takes the message (assumed to only contain characters included in the alphabet) and encrypts first character by "cycling" t places to the right in the alphabet where t is the value at the starting point y in the pad. In other words, the first character is encrypted by computing the mod-q sum of the integer representation of that character with the value t of element y in the one-time pad. Similarly, the second and subsequent characters are using y+1 and subsequent element of the pad; keeping a record of the last value used so that next message can be guaranteed to use a different, unused section of the pad.

Note that, whereas the large modulus M is used within the PRNG to generate the one-time pad, encryption is performed with respect to the modulus q where q is the size of the alphabet.

The encrypted message will look like a random string of characters in the alphabet. There is no way of telling whether an apparently random string is simply a part of the one-time pad, or contains an encrypted message.

For example, the message may read:

HELLO which can be converted into numerical values by transforming each letter of the alphabet into the numerical value of its location in the alphabet. That is, A=0, B=1, . . . , Z=25, as shown in the table below.

| A | B | C | D | E | F | G | H | I | J | K | L | M |
|---|---|---|---|---|---|---|---|---|---|---|---|---|
| 0 | 1 | 2 | 3 | 4 | 5 | 6 | 7 | 8 | 9 | 10 | 11 | 12 |
| N | O | P | Q | R | S | T | U | V | W | X | Y | Z |
| 13 | 14 | 15 | 16 | 17 | 18 | 19 | 20 | 21 | 22 | 23 | 24 | 25 |

The message 506 can therefore be represented as a sequence of numerical values:

7, 4, 11, 11, 14.

As an example, say the first five terms of the one-time pad are:

23, 5, 16, 2, 21.

The message can be transformed by the modular addition of corresponding terms, the modulus being q=26:

(7+23) mod 26, (4+5) mod 26, (11+16) mod 26, (11+2) mod 26, (14+21) mod 26

=4, 9, 1, 13, 9

=E J B N J (the encrypted message).

At step 310, Alice sends the encrypted message to the Bob, together with the starting point y in the pad. The message is decrypted (Step 312) by Bob simply reversing the encryption algorithm, starting at the correct place y in Bob's identical one-time pad.

As will be appreciated, the names Alice and Bob are merely convenient labels with no implication as to the nature of the parties involved. In many practical contexts, Alice and Bob's steps will be performed by suitably-configured computer devices. To the extent any human input is involved, in many cases this may be restricted to the formation of the plaintext message to be encrypted, with the actual encryption and decryption steps being performed by the devices involved. For example, those functions may be implemented in software executed on the respective devices.

Widespread use of such methods effectively increases the security of such communications.

As an additional security measure, Alice could for example send 10 different "messages" most of which are just sections of the pad (or contain an obviously meaningless string of plaintext); an attacker would need to attempt to decrypt all of them to know whether any of them are meaningful. If none of the "messages" is amenable to cryptanalysis the attacker is in danger of just spending time trying to analyse effectively "random" sequences.

There is no way for an attacker to distinguish between a section of the pad and a cyphertext (since both appear to be random strings). By contrast, the intended recipient knows the correct initialisation and simply needs to decrypt each string and see whether the result is meaningful or not.

Messages can be communicated using any suitable channel. For example, Alice could post one or more web pages that may contain messages for particular "agents", where a different set of secret information is shared with each agent. Each agent attempts to decrypt each message using his "secret information"; he will see any messages intended for him; all other pages will fail to decrypt. An attacker would not know how many of the pages contain messages nor which agent they were intended for, unless they knew each agent's "secret information". Such a page could be posted daily, but only send a message occasionally. An attacker would never know if there is a message actually being sent, as opposed to simply, random "noise".

One page could he posted which contains messages for a number of different agents at different places on the page. Each agent will see a meaningful message at the relevant section of the page (assuming there is a message intended for him). An attacker would not be able to see any of the messages unless he knows each set of "secret information".

A section of "random" text (standard length, e.g. 80 characters, or 200 characters, or longer) at the foot of every email exchanged with an agent; an attacker would have no idea whether any particular mail included just random noise or a real message. If all (or a significant proportion) of email messages contained similar random strings there would be no information to be gained even by analysing which pairs of email addresses were including such strings.

One set of "secret information" could be used for messages going in each direction, or Alice could share one set and divide the pad into blocks of standard length which are used alternately for messages going in each direction.

The method can be used in real time for sharing intelligence and/or orders with a field agent. Without knowing all the relevant "secret information" it is impossible for an eavesdropper to know anything about what is being communicated.

By way of example, one practical application could use the method for transmitting data collected at a remote location (such as an oil rig, oil drilling platform, seismic logging facility, offshore windfarm etc.) to a central data processing or storage and distribution facility.

The method can be used for distributing large files in a secure manner to a purchaser. The encrypted files can be transferred to the would-be purchaser in advance of payment. On confirmation of both the file transfer and the payment the secret information can be shared with the purchaser who can then decrypt and read the contents of the file.

At the hardware level, the steps or functionality of the present disclosure may be implemented using a range of computer architectures. A computer system may comprise one or more computers, which in turn may comprise programmable and/or non-programmable processing hardware. Examples of programmable processing hardware include a CPU or CPUs, GPU(s)/accelerator processor(s) or any other general-purpose/instruction-based processor(s). In such cases, the method steps, algorithms, functions, functional components etc. disclosed herein may be encoded in computer-readable instructions embodied in transitory or non-transitory computer-readable media, and carried cut/implemented though execution of those instructions on an instruction-based processor(s). Examples of non-transitory media include magnetic, solid-state and optical storage. Another example of programmable hardware is a processor(s) in the form of an FPGA(s) (field-programmable gate array) whose circuit. configuration may be programmed via circuit description code and the like. Non-programmable hardware includes, for example, a non-programmable processor(s) in the form of an ASIC(s) (application-specific integrated circuit). In general, a computer, processor and the like may be formed of any type or combination of programmable and/or non-programmable, hardware configured to carry out any of the steps or implement any of the functionality disclosed herein. The terms computer program and program code encompass computer-readable instructions, circuit description code and the like for programming a programmable computer system to carry out such steps or implement such functionality.

ANNEX A—SUMMARY OF TEST RESULTS

TABLE 1

| | Modulus $2^{120}$ | | | | | | | | |
|---|---|---|---|---|---|---|---|---|---|
| | Seed = $s1*2^{90} + s2*2^{60} + s3*2^{30} + s4$ | | | | | | | | |
| | Initial values all zero | | | | | | | | |
| | Seed s1 | Seed s2 | Seed s3 | Seed s4 | Order 8 | Order 9 | Order 10 | Order 11 | Order 12 |
| M1000 | Not used | | | | | | | | |
| M1001 | 0 | 0 | 0 | 1 | 34 (1) | 21 (6) | 5 (0) | 1 (0) | 1 (0) |
| M1002 | Not used | | | | | | | | |
| M1003 | 0 | 0 | 1 | 1 | 22 (2) | 5 (0) | 0 (1) | 0 (0) | 0 (0) |
| M1004 | 0 | 1 | 1 | 1 | 4 (0) | 0 (0) | 0 (0) | 0 (0) | 0 (0) |
| M1005 | 1 | 1 | 1 | 1 | 0 (0) | 0 (0) | 0 (0) | 0 (0) | 0 (0) |
| M1006 | 0 | 1 | 0 | 1 | 4 (0) | 0 (0) | 0 (0) | 0 (0) | 0 (0) |
| M1007 | 1 | 0 | 0 | 1 | 5 (0) | 1 (0) | 0 (0) | 0 (0) | 0 (0) |
| M1008 | 1 | 0 | 1 | 1 | 3 (0) | 0 (0) | 0 (0) | 0 (0) | 0 (0) |
| M1009 | 1 | 1 | 0 | 1 | 0 (0) | 0 (0) | 0 (0) | 0 (0) | 0 (0) |
| M1010 | 9 | 77 | 555 | 3333 | 0 (0) | 0 (0) | 0 (0) | 0 (0) | 0 (0) |
| M1011 | 3333 | 555 | 77 | 9 | 0 (0) | 0 (0) | 0 (0) | 0 (0) | 0 (0) |
| M1012 | 11062019 | 12101955 | 30122017 | 29012019 | 0 (0) | 0 (0) | 0 (0) | 0 (1) | 0 (0) |
| M1013 | 29012019 | 30122017 | 12101955 | 11062019 | 0 (1) | 0 (0) | 0 (0) | 0 (0) | 0 (0) |
| M1014 | 12345 | 6789 | 98765 | 4321 | 0 (1) | 0 (0) | 0 (0) | 0 (0) | 0 (0) |
| M1015 | 4321 | 98765 | 6789 | 12345 | 0 (0) | 0 (0) | 0 (0) | 0 (0) | 0 (0) |
| M1016 | 12345 | 34567 | 56789 | 98765 | 0 (0) | 0 (0) | 0 (0) | 0 (0) | 0 (0) |
| M1017 | 98765 | 56789 | 34567 | 12345 | 0 (0) | 0 (0) | 0 (0) | 0 (0) | 0 (0) |
| M1018 | 1 | 1 | 1 | 731 | 0 (0) | 0 (0) | 0 (0) | 0 (0) | 0 (0) |
| M1019 | 731 | 1 | 1 | 1 | 0 (0) | 0 (1) | 0 (0) | 0 (0) | 0 (0) |
| M1005 | 1 | 1 | 1 | 1 | 0 (0) | 0 (0) | 0 (0) | 0 (0) | 0 (0) |
| M1050 | 2 | 1 | 1 | 1 | 0 (0) | 0 (0) | 0 (0) | 0 (0) | 0 (0) |
| M1051 | 4 | 1 | 1 | 1 | 0 (0) | 0 (0) | 0 (0) | 0 (0) | 0 (0) |
| M1052 | 8 | 1 | 1 | 1 | 0 (0) | 0 (0) | 0 (0) | 0 (0) | 0 (0) |
| M1053 | 32 | 1 | 1 | 1 | 1 (0) | 0 (0) | 0 (0) | 0 (1) | 0 (0) |
| M1054 | 1024 | 1 | 1 | 1 | 1 (0) | 0 (0) | 0 (1) | 0 (0) | 0 (0) |
| M1055 | 1048576 | 1 | 1 | 1 | 2 (0) | 0 (0) | 0 (0) | 0 (0) | 0 (0) |
| M1056 | 33554432 | 1 | 1 | 1 | 3 (1) | 0 (0) | 0 (0) | 0 (0) | 0 (0) |
| M1057 | 134217728 | 1 | 1 | 1 | 3 (0) | 0 (0) | 0 (0) | 0 (0) | 0 (0) |
| M1058 | 268435456 | 1 | 1 | 1 | 3 (0) | 0 (0) | 0 (0) | 0 (0) | 0 (0) |
| M1059 | 536870912 | 1 | 1 | 1 | 3 (1) | 0 (0) | 0 (0) | 0 (0) | 0 (0) |
| M1060 | 1 | 2 | 1 | 1 | 0 (0) | 0 (0) | 0 (0) | 0 (0) | 0 (0) |
| M1061 | 1 | 4 | 1 | 1 | 0 (0) | 0 (0) | 0 (0) | 0 (0) | 0 (0) |
| M1062 | 1 | 8 | 1 | 1 | 0 (0) | 0 (0) | 0 (0) | 0 (0) | 0 (1) |
| M1063 | 1 | 32 | 1 | 1 | 0 (0) | 0 (0) | 0 (0) | 0 (0) | 0 (0) |
| M1064 | 1 | 1024 | 1 | 1 | 0 (0) | 0 (0) | 0 (0) | 0 (0) | 0 (0) |
| M1065 | 1 | 1048576 | 1 | 1 | 0 (0) | 0 (0) | 0 (0) | 0 (0) | 0 (0) |
| M1066 | 1 | 33554432 | 1 | 1 | 0 (0) | 0 (0) | 0 (0) | 0 (0) | 0 (0) |
| M1067 | 1 | 134217728 | 1 | 1 | 2 (0) | 0 (0) | 0 (0) | 0 (0) | 0 (0) |
| M1068 | 1 | 268435456 | 1 | 1 | 2 (0) | 0 (0) | 0 (0) | 0 (0) | 0 (0) |
| M1069 | 1 | 536870912 | 1 | 1 | 2 (0) | 0 (0) | 0 (0) | 0 (0) | 0 (0) |
| M1070 | 1 | 1 | 2 | 1 | 0 (0) | 0 (0) | 0 (0) | 0 (0) | 0 (1) |
| M1071 | 1 | 1 | 4 | 1 | 0 (0) | 0 (0) | 0 (0) | 0 (2) | 0 (0) |
| M1072 | 1 | 1 | 8 | 1 | 0 (0) | 0 (0) | 0 (0) | 0 (0) | 0 (0) |
| M1073 | 1 | 1 | 32 | 1 | 0 (0) | 0 (0) | 0 (0) | 0 (0) | 0 (0) |
| M1074 | 1 | 1 | 1024 | 1 | 0 (0) | 0 (0) | 0 (0) | 0 (0) | 0 (0) |
| M1075 | 1 | 1 | 1048576 | 1 | 0 (0) | 0 (0) | 0 (0) | 0 (0) | 0 (0) |
| M1076 | 1 | 1 | 33554432 | 1 | 0 (0) | 0 (0) | 0 (0) | 0 (0) | 0 (0) |
| M1077 | 1 | 1 | 134217728 | 1 | 0 (0) | 0 (0) | 0 (0) | 0 (0) | 0 (0) |
| M1078 | 1 | 1 | 268435456 | 1 | 0 (0) | 0 (0) | 0 (0) | 0 (0) | 0 (0) |
| M1079 | 1 | 1 | 536870912 | 1 | 0 (0) | 0 (0) | 0 (0) | 0 (0) | 0 (0) |
| M1080 | 1 | 1 | 1 | 3 | 0 (0) | 0 (0) | 0 (1) | 0 (0) | 0 (0) |
| M1081 | 1 | 1 | 1 | 5 | 0 (0) | 0 (0) | 0 (0) | 0 (0) | 0 (0) |
| M1082 | 1 | 1 | 1 | 9 | 0 (0) | 0 (1) | 0 (0) | 0 (0) | 0 (0) |
| M1083 | 1 | 1 | 1 | 33 | 0 (0) | 0 (0) | 0 (0) | 0 (0) | 0 (0) |
| M1084 | 1 | 1 | 1 | 1025 | 0 (0) | 0 (0) | 0 (0) | 0 (0) | 0 (0) |
| M1085 | 1 | 1 | 1 | 1048577 | 0 (0) | 0 (0) | 0 (0) | 0 (0) | 0 (0) |
| M1086 | 1 | 1 | 1 | 33554433 | 0 (0) | 0 (0) | 0 (0) | 0 (0) | 0 (0) |
| M1087 | 1 | 1 | 1 | 134217729 | 0 (0) | 0 (0) | 0 (0) | 0 (0) | 0 (0) |

TABLE 1-continued

Modulus 2^120
Seed = s1*2^90 + s2*2^60 + s3*2^30 + s4
Initial values all zero

| | Seed s1 | Seed s2 | Seed s3 | Seed s4 | Order 8 | Order 9 | Order 10 | Order 11 | Order 12 |
|---|---|---|---|---|---|---|---|---|---|
| M1088 | 1 | 1 | 1 | 268435457 | 0 (0) | 0 (0) | 0 (0) | 0 (0) | 0 (0) |
| M1089 | 1 | 1 | 1 | 536870913 | 0 (0) | 0 (0) | 0 (0) | 0 (0) | 0 (0) |

| | Order 13 | Order 14 | Order 15 | Order 16 | Order 17 | Order 18 | Order 19 | Order 20 | Order 21 | Order 22 | Order 23 | Order 24 | Order 25 |
|---|---|---|---|---|---|---|---|---|---|---|---|---|---|
| M1000 | | | | | | | | | | | | | |
| M1001 | 1 (0) | 1 (0) | 0 (0) | 0 (0) | 0 (0) | 0 (0) | 0 (0) | 0 (1) | 0 (0) | 0 (0) | 0 (0) | 0 (0) | 0 (0) |
| M1002 | | | | | | | | | | | | | |
| M1003 | 0 (0) | 0 (0) | 0 (1) | 0 (0) | 0 (0) | 0 (1) | 0 (0) | 0 (0) | 0 (1) | 0 (0) | 0 (0) | 0 (0) | 0 (0) |
| M1004 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) |
| M1005 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) |
| M1006 | 0 (1) | 0 (0) | 0 (0) | 0 (0) | 0 (0) | 0 (0) | 0 (0) | 0 (0) | 0 (0) | 0 (0) | 0 (1) | 0 (0) | 0 (1) |
| M1007 | 0 (0) | 0 (0) | 0 (0) | 0 (0) | 0 (0) | 0 (0) | 0 (0) | 0 (0) | 0 (0) | 0 (1) | 0 (0) | 0 (0) | 0 (0) |
| M1008 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) |
| M1009 | 0 (0) | 0 (0) | 0 (0) | 0 (0) | 0 (0) | 0 (0) | 0 (0) | 0 (0) | 0 (0) | 0 (1) | 0 (0) | 0 (1) | 0 (0) |
| M1010 | 0 (0) | 0 (1) | 0 (0) | 0 (1) | 0 (0) | 0 (0) | 0 (0) | 0 (0) | 0 (0) | 0 (0) | 0 (0) | 0 (0) | 0 (0) |
| M1011 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) |
| M1012 | 0 (0) | 0 (2) | 0 (0) | 0 (0) | 0 (0) | 0 (0) | 0 (0) | 0 (0) | 0 (0) | 0 (0) | 0 (1) | 0 (0) | 0 (0) |
| M1013 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) |
| M1014 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) |
| M1015 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) |
| M1016 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) |
| M1017 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) |
| M1018 | 0 (0) | 0 (0) | 0 (1) | 0 (1) | 0 (0) | 0 (0) | 0 (0) | 0 (0) | 0 (0) | 0 (0) | 0 (0) | 0 (0) | 0 (0) |
| M1019 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) |
| M1005 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) |
| M1050 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) |
| M1051 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) |
| M1052 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (1) |
| M1053 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) |
| M1054 | 0 (0) | 0 (0) | 0 (0) | 0 (0) | 0 (0) | 0 (0) | 0 (0) | 0 (0) | 0 (1) | 0 (0) | 0 (0) | 0 (0) | 0 (0) |
| M1055 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) |
| M1056 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) |
| M1057 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) |
| M1058 | 0 (0) | 0 (0) | 0 (1) | 0 (0) | 0 (0) | 0 (0) | 0 (0) | 0 (0) | 0 (1) | 0 (0) | 0 (0) | 0 (0) | 0 (0) |
| M1059 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) |
| M1060 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) |
| M1061 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) |
| M1062 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) |
| M1063 | 0 (0) | 0 (0) | 0 (0) | 0 (0) | 0 (0) | 0 (1) | 0 (0) | 0 (0) | 0 (0) | 0 (0) | 0 (0) | 0 (0) | 0 (0) |
| M1064 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) |
| M1065 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (1) |
| M1066 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) |
| M1067 | 0 (0) | 0 (0) | 0 (0) | 0 (0) | 0 (0) | 0 (1) | 0 (0) | 0 (0) | 0 (1) | 0 (0) | 0 (0) | 0 (0) | 0 (0) |
| M1068 | 0 (0) | 0 (0) | 0 (0) | 0 (1) | 0 (0) | 0 (0) | 0 (0) | 0 (0) | 0 (0) | 0 (0) | 0 (0) | 0 (0) | 0 (0) |
| M1069 | 0 (0) | 0 (0) | 0 (1) | 0 (0) | 0 (0) | 0 (0) | 0 (0) | 0 (0) | 0 (0) | 0 (0) | 0 (0) | 0 (0) | 0 (0) |
| M1070 | 0 (0) | 0 (0) | 0 (0) | 0 (0) | 0 (0) | 0 (0) | 0 (0) | 0 (1) | 0 (0) | 0 (0) | 0 (1) | 0 (0) | 0 (0) |
| M1071 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) |
| M1072 | 0 (0) | 0 (0) | 0 (0) | 0 (0) | 0 (0) | 0 (0) | 0 (0) | 0 (0) | 0 (1) | 0 (0) | 0 (0) | 0 (0) | 0 (0) |
| M1073 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) |
| M1074 | 0 (0) | 0 (1) | 0 (0) | 0 (0) | 0 (0) | 0 (0) | 0 (0) | 0 (1) | 0 (0) | 0 (0) | 0 (0) | 0 (0) | 0 (0) |
| M1075 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) |
| M1076 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) |
| M1077 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) |
| M1078 | 0 (1) | 0 (0) | 0 (0) | 0 (0) | 0 (0) | 0 (0) | 0 (0) | 0 (1) | 0 (0) | 0 (0) | 0 (1) | 0 (0) | 0 (0) |
| M1079 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) |
| M1080 | 0 (0) | 0 (0) | 0 (0) | 0 (0) | 0 (0) | 0 (0) | 0 (0) | 0 (0) | 0 (1) | 0 (1) | 0 (0) | 0 (0) | 0 (0) |
| M1081 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) |
| M1082 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (1) |
| M1083 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (1) |
| M1084 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) |
| M1085 | 0 (0) | 0 (0) | 0 (0) | 0 (0) | 0 (0) | 0 (0) | 0 (0) | 0 (0) | 0 (0) | 0 (0) | 0 (1) | 0 (0) | 0 (0) |
| M1086 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) |
| M1087 | 0 (0) | 0 (0) | 0 (0) | 0 (0) | 0 (0) | 0 (0) | 0 (0) | 0 (1) | 0 (0) | 0 (0) | 0 (0) | 0 (0) | 0 (0) |
| M1088 | 0 (0) | 0 (0) | 0 (0) | 0 (0) | 0 (0) | 0 (0) | 0 (0) | 0 (0) | 0 (0) | 0 (0) | 0 (1) | 0 (0) | 0 (0) |
| M1089 | 0 (0) | 0 (0) | 0 (0) | 0 (1) | 0 (0) | 0 (0) | 0 (0) | 0 (0) | 0 (0) | 0 (0) | 0 (2) | 0 (0) | 0 (0) |
| | Order 13 | Order 14 | Order 15 | Order 16 | Order 17 | Order 18 | Order 19 | Order 20 | Order 21 | Order 22 | Order 23 | Order 24 | Order 25 |

TABLE 2

Modulus 2^120
Seed = s1*2^90 + s2*2^60 + s3*2^30 + s4
Initial values all zero

| | Seed s1 | Seed s2 | Seed s3 | Seed s4 | Order 8 | Order 9 | Order 10 | Order 11 | Order 12 |
|---|---|---|---|---|---|---|---|---|---|
| N1000 | Not used | | | | | | | | |
| N1001 | 1073741823 | 1073741823 | 1073741823 | 1073741823 | 34 (1) | 21 (5) | 5 (0) | 1 (0) | 1 (0) |
| N1002 | Not used | | | | | | | | |
| N1003 | 1073741823 | 1073741823 | 1073741822 | 1073741823 | 22 (2) | 5 (0) | 0 (0) | 0 (0) | 0 (0) |
| N1004 | 1073741823 | 1073741822 | 1073741822 | 1073741823 | 4 (0) | 0 (0) | 0 (0) | 0 (0) | 0 (0) |
| N1005 | 1073741822 | 1073741822 | 1073741823 | 1073741823 | 0 (0) | 0 (0) | 0 (0) | 0 (0) | 0 (0) |
| N1006 | 1073741823 | 1073741822 | 1073741823 | 1073741823 | 4 (0) | 0 (0) | 0 (0) | 0 (0) | 0 (0) |
| N1007 | 1073741822 | 1073741823 | 1073741823 | 1073741823 | 5 (0) | 1 (0) | 0 (0) | 0 (0) | 0 (0) |
| N1008 | 1073741822 | 1073741823 | 1073741822 | 1073741823 | 3 (0) | 0 (0) | 0 (0) | 0 (0) | 0 (0) |
| N1009 | 1073741822 | 1073741822 | 1073741822 | 1073741823 | 0 (0) | 0 (0) | 0 (0) | 0 (0) | 0 (0) |
| N1010 | 1073741814 | 1073741746 | 1073741268 | 1073738491 | 0 (0) | 0 (0) | 0 (0) | 0 (0) | 0 (0) |
| N1011 | 1073738490 | 1073741268 | 1073741746 | 1073741815 | 0 (0) | 0 (0) | 0 (0) | 0 (1) | 0 (0) |
| N1012 | 1062679804 | 1061639868 | 1043619806 | 1044729805 | 0 (0) | 0 (0) | 0 (0) | 0 (0) | 0 (0) |
| N1013 | 1044729804 | 1043619806 | 1061639868 | 1062679805 | 0 (0) | 0 (0) | 0 (0) | 0 (0) | 0 (0) |
| N1014 | 1073729478 | 1073735034 | 1073643058 | 1073737503 | 0 (0) | 0 (0) | 0 (0) | 0 (0) | 0 (0) |
| N1015 | 1073737502 | 1073643058 | 1073735034 | 1073729479 | 0 (0) | 0 (0) | 0 (0) | 0 (0) | 0 (0) |
| N1016 | 1073729478 | 1073707256 | 1073685034 | 1073643059 | 0 (0) | 0 (0) | 0 (0) | 0 (0) | 0 (0) |
| N1017 | 1073643058 | 1073685034 | 1073707256 | 1073729479 | 0 (0) | 0 (0) | 0 (0) | 0 (0) | 0 (0) |
| N1018 | 1073741822 | 1073741822 | 1073741822 | 1073741093 | 0 (0) | 0 (0) | 0 (0) | 0 (0) | 0 (0) |
| N1019 | 1073741092 | 1073741822 | 1073741822 | 1073741823 | 0 (0) | 0 (0) | 0 (0) | 0 (0) | 0 (0) |
| N1005 | 1073741822 | 1073741822 | 1073741822 | 1073741823 | 0 (0) | 0 (0) | 0 (0) | 0 (0) | 0 (0) |
| N1050 | 1073741821 | 1073741822 | 1073741822 | 1073741823 | 0 (0) | 0 (0) | 0 (0) | 0 (0) | 0 (0) |
| N1051 | 1073741819 | 1073741822 | 1073741822 | 1073741823 | 0 (0) | 0 (0) | 0 (0) | 0 (0) | 0 (0) |
| N1052 | 1073741815 | 1073741822 | 1073741822 | 1073741823 | 0 (0) | 0 (0) | 0 (0) | 0 (0) | 0 (0) |
| N1053 | 1073741791 | 1073741822 | 1073741822 | 1073741823 | 1 (0) | 0 (0) | 0 (0) | 0 (1) | 0 (0) |
| N1054 | 1073740799 | 1073741822 | 1073741822 | 1073741823 | 1 (0) | 0 (0) | 0 (0) | 0 (0) | 0 (0) |
| N1055 | 1072693247 | 1073741822 | 1073741822 | 1073741823 | 2 (0) | 0 (0) | 0 (0) | 0 (0) | 0 (0) |
| N1056 | 1040187391 | 1073741822 | 1073741822 | 1073741823 | 3 (0) | 0 (0) | 0 (0) | 0 (0) | 0 (0) |
| N1057 | 939524095 | 1073741822 | 1073741822 | 1073741823 | 3 (0) | 0 (0) | 0 (0) | 0 (1) | 0 (0) |
| N1058 | 805306367 | 1073741822 | 1073741822 | 1073741823 | 3 (0) | 0 (0) | 0 (0) | 0 (0) | 0 (0) |
| N1059 | 536870911 | 1073741822 | 1073741822 | 1073741823 | 3 (1) | 0 (0) | 0 (0) | 0 (0) | 0 (0) |
| N1060 | 1073741822 | 1073741821 | 1073741822 | 1073741823 | 0 (0) | 0 (0) | 0 (0) | 0 (0) | 0 (0) |
| N1061 | 1073741822 | 1073741819 | 1073741822 | 1073741823 | 0 (0) | 0 (0) | 0 (0) | 0 (0) | 0 (0) |
| N1062 | 1073741822 | 1073741815 | 1073741822 | 1073741823 | 0 (0) | 0 (0) | 0 (0) | 0 (0) | 0 (0) |
| N1063 | 1073741822 | 1073741791 | 1073741822 | 1073741823 | 0 (0) | 0 (0) | 0 (0) | 0 (0) | 0 (0) |
| N1064 | 1073741822 | 1073740799 | 1073741822 | 1073741823 | 0 (0) | 0 (0) | 0 (0) | 0 (0) | 0 (0) |
| N1065 | 1073741822 | 1072693247 | 1073741822 | 1073741823 | 0 (0) | 0 (0) | 0 (0) | 0 (0) | 0 (0) |
| N1066 | 1073741822 | 1040187391 | 1073741822 | 1073741823 | 0 (0) | 0 (0) | 0 (0) | 0 (0) | 0 (0) |
| N1067 | 1073741822 | 939524095 | 1073741822 | 1073741823 | 2 (0) | 0 (0) | 0 (0) | 0 (0) | 0 (0) |
| N1068 | 1073741822 | 805306367 | 1073741822 | 1073741823 | 2 (0) | 0 (0) | 0 (1) | 0 (0) | 0 (0) |
| N1069 | 1073741822 | 536870911 | 1073741822 | 1073741823 | 2 (0) | 0 (0) | 0 (0) | 0 (0) | 0 (0) |
| N1070 | 1073741822 | 1073741822 | 1073741821 | 1073741823 | 0 (1) | 0 (0) | 0 (0) | 0 (0) | 0 (1) |
| N1071 | 1073741822 | 1073741822 | 1073741819 | 1073741823 | 0 (0) | 0 (0) | 0 (0) | 0 (2) | 0 (0) |
| N1072 | 1073741822 | 1073741822 | 1073741815 | 1073741823 | 0 (0) | 0 (0) | 0 (0) | 0 (0) | 0 (0) |
| N1073 | 1073741822 | 1073741822 | 1073741791 | 1073741823 | 0 (0) | 0 (0) | 0 (0) | 0 (0) | 0 (0) |
| N1074 | 1073741822 | 1073741822 | 1073740799 | 1073741823 | 0 (0) | 0 (0) | 0 (0) | 0 (0) | 0 (0) |
| N1075 | 1073741822 | 1073741822 | 1072693247 | 1073741823 | 0 (0) | 0 (0) | 0 (0) | 0 (0) | 0 (0) |
| N1076 | 1073741822 | 1073741822 | 1040187391 | 1073741823 | 0 (0) | 0 (0) | 0 (0) | 0 (0) | 0 (0) |
| N1077 | 1073741822 | 1073741822 | 939524095 | 1073741823 | 0 (0) | 0 (0) | 0 (0) | 0 (0) | 0 (0) |
| N1078 | 1073741822 | 1073741822 | 805306367 | 1073741823 | 0 (0) | 0 (0) | 0 (0) | 0 (0) | 0 (0) |
| N1079 | 1073741822 | 1073741822 | 536870911 | 1073741823 | 0 (0) | 0 (0) | 0 (0) | 0 (0) | 0 (0) |
| N1080 | 1073741822 | 1073741822 | 1073741822 | 1073741821 | 0 (0) | 0 (0) | 0 (0) | 0 (0) | 0 (0) |
| N1081 | 1073741822 | 1073741822 | 1073741822 | 1073741819 | 0 (0) | 0 (0) | 0 (0) | 0 (0) | 0 (0) |
| N1082 | 1073741822 | 1073741822 | 1073741822 | 1073741815 | 0 (0) | 0 (0) | 0 (0) | 0 (0) | 0 (0) |
| N1083 | 1073741822 | 1073741822 | 1073741822 | 1073741791 | 0 (0) | 0 (0) | 0 (1) | 0 (0) | 0 (0) |
| N1084 | 1073741822 | 1073741822 | 1073741822 | 1073740799 | 0 (0) | 0 (0) | 0 (0) | 0 (0) | 0 (0) |
| N1085 | 1073741822 | 1073741822 | 1073741822 | 1072693247 | 0 (0) | 0 (0) | 0 (0) | 0 (0) | 0 (0) |
| N1086 | 1073741822 | 1073741822 | 1073741822 | 1040187391 | 0 (0) | 0 (0) | 0 (0) | 0 (0) | 0 (0) |
| N1087 | 1073741822 | 1073741822 | 1073741822 | 939524095 | 0 (0) | 0 (0) | 0 (0) | 0 (0) | 0 (0) |
| N1088 | 1073741822 | 1073741822 | 1073741822 | 805306367 | 0 (0) | 0 (0) | 0 (0) | 0 (0) | 0 (0) |
| N1089 | 1073741822 | 1073741822 | 1073741822 | 536870911 | 0 (0) | 0 (0) | 0 (0) | 0 (0) | 0 (0) |
| | Seed s1 | Seed s2 | Seed s3 | Seed s4 | Order 8 | Order 9 | Order 10 | Order 11 | Order 12 |

| | Order 13 | Order 14 | Order 15 | Order 16 | Order 17 | Order 18 | Order 19 | Order 20 | Order 21 | Order 22 | Order 23 | Order 24 | Order 25 |
|---|---|---|---|---|---|---|---|---|---|---|---|---|---|
| N1000 | | | | | | | | | | | | | |
| N1001 | 1 (0) | 1 (0) | 0 (0) | 0 (0) | 0 (0) | 0 (0) | 0 (0) | 0 (0) | 0 (0) | 0 (0) | 0 (0) | 0 (0) | 0 (0) |
| N1002 | | | | | | | | | | | | | |
| N1003 | 0 (0) | 0 (0) | 0 (1) | 0 (0) | 0 (0) | 0 (1) | | 0 (0) | 0 (0) | 0 (0) | 0 (0) | 0 (0) | 0 (0) |
| N1004 | 0 (0) | 0 (0) | 0 (0) | 0 (0) | 0 (0) | 0 (0) | | 0 (0) | 0 (0) | 0 (0) | 0 (0) | 0 (0) | 0 (0) |
| N1005 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) |

TABLE 2-continued

Modulus 2^120
Seed = s1*2^90 + s2*2^60 + s3*2^30 + s4
Initial values all zero

| | | | | | | | | | | | | | | | |
|---|---|---|---|---|---|---|---|---|---|---|---|---|---|---|---|
| N1006 | 0 (0) | 0 (0) | 0 (0) | | | 0 (0) | | 0 (0) | 0 (0) | 0 (0) | 0 (0) | 0 (0) | 0 (0) | 0 (0) | |
| N1007 | 0 (0) | 0 (0) | 0 (0) | | | 0 (0) | | | 0 (0) | 0 (1) | 0 (0) | 0 (0) | 0 (0) | | |
| N1008 | 0 (0) | 0 (0) | 0 (0) | | | 0 (0) | | | 0 (0) | | 0 (0) | | 0 (0) | | |
| N1009 | 0 (0) | 0 (0) | 0 (0) | | | 0 (0) | | | 0 (0) | | 0 (0) | | 0 (0) | | |
| N1010 | 0 (0) | 0 (1) | 0 (0) | 0 (1) | 0 (0) | 0 (0) | 0 (0) | 0 (0) | 0 (0) | 0 (0) | 0 (0) | 0 (0) | 0 (0) | 0 (0) | |
| N1011 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) | |
| N1012 | 0 (0) | 0 (2) | 0 (0) | 0 (0) | 0 (0) | 0 (0) | 0 (0) | 0 (0) | 0 (1) | 0 (1) | 0 (0) | 0 (0) | 0 (0) | 0 (0) | |
| N1013 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) | |
| N1014 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) | |
| N1015 | 0 (0) | 0 (0) | 0 (0) | 0 (0) | 0 (0) | 0 (0) | 0 (0) | 0 (0) | 0 (1) | 0 (0) | 0 (0) | 0 (0) | 0 (0) | 0 (0) | |
| N1016 | 0 (0) | 0 (1) | 0 (0) | 0 (0) | 0 (0) | 0 (0) | 0 (0) | 0 (0) | 0 (0) | 0 (0) | 0 (0) | 0 (0) | 0 (0) | 0 (0) | |
| N1017 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) | |
| N1018 | 0 (0) | 0 (0) | 0 (0) | 0 (1) | 0 (0) | 0 (0) | 0 (0) | 0 (0) | 0 (0) | 0 (0) | 0 (0) | 0 (0) | 0 (0) | 0 (0) | |
| N1019 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) | |
| N1005 | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) | 0 (0) | |
| N1050 | 0 (0) | 0 (0) | 0 (0) | | | | | | | | | | | | |
| N1051 | 0 (0) | 0 (0) | 0 (0) | | | | | | | | | | | | |
| N1052 | 0 (0) | 0 (0) | 0 (0) | | | | | | | | | | | | |
| N1053 | 0 (0) | 0 (0) | 0 (0) | | | | | | | | | | | | |
| N1054 | 0 (0) | 0 (0) | 0 (0) | | | | | | | | | | | | |
| N1055 | 0 (0) | 0 (0) | 0 (0) | | | | | | | | | | | | |
| N1056 | 0 (0) | 0 (0) | 0 (0) | | | | | | | | | | | | |
| N1057 | 0 (0) | 0 (0) | 0 (0) | | | | | | | | | | | | |
| N1058 | 0 (0) | 0 (0) | 0 (0) | | | | | | | | | | | | |
| N1059 | 0 (0) | 0 (0) | 0 (0) | | | | | | | | | | | | |
| N1060 | 0 (0) | 0 (0) | 0 (0) | | | | | | | | | | | | |
| N1061 | 0 (0) | 0 (0) | 0 (0) | | | | | | | | | | | | |
| N1062 | 0 (0) | 0 (0) | 0 (0) | | | | | | | | | | | | |
| N1063 | 0 (0) | 0 (0) | 0 (0) | | | | | | | | | | | | |
| N1064 | 0 (0) | 0 (0) | 0 (0) | | | | | | | | | | | | |
| N1065 | 0 (0) | 0 (0) | 0 (0) | | | | | | | | | | | | |
| N1066 | 0 (0) | 0 (0) | 0 (0) | | | | | | | | | | | | |
| N1067 | 0 (0) | 0 (0) | 0 (0) | | | | | | | | | | | | |
| N1068 | 0 (0) | 0 (0) | 0 (0) | | | | | | | | | | | | |
| N1069 | 0 (0) | 0 (0) | 0 (0) | | | | | | | | | | | | |
| N1070 | 0 (0) | 0 (0) | 0 (0) | | | | | | | | | | | | |
| N1071 | 0 (0) | 0 (0) | 0 (0) | | | | | | | | | | | | |
| N1072 | 0 (0) | 0 (0) | 0 (0) | | | | | | | | | | | | |
| N1073 | 0 (0) | 0 (0) | 0 (0) | | | | | | | | | | | | |
| N1074 | 0 (0) | 0 (0) | 0 (0) | | | | | | | | | | | | |
| N1075 | 0 (0) | 0 (0) | 0 (0) | | | | | | | | | | | | |
| N1076 | 0 (0) | 0 (0) | 0 (0) | | | | | | | | | | | | |
| N1077 | 0 (0) | 0 (0) | 0 (0) | | | | | | | | | | | | |
| N1078 | 0 (0) | 0 (0) | 0 (0) | | | | | | | | | | | | |
| N1079 | 0 (0) | 0 (0) | 0 (0) | | | | | | | | | | | | |
| N1080 | 0 (0) | 0 (0) | 0 (0) | | | | | | | | | | | | |
| N1081 | 0 (0) | 0 (0) | 0 (0) | | | | | | | | | | | | |
| N1082 | 0 (0) | 0 (0) | 0 (0) | | | | | | | | | | | | |
| N1083 | 0 (0) | 0 (0) | 0 (0) | | | | | | | | | | | | |
| N1084 | 0 (0) | 0 (0) | 0 (0) | | | | | | | | | | | | |
| N1085 | 0 (0) | 0 (0) | 0 (0) | | | | | | | | | | | | |
| N1086 | 0 (0) | 0 (0) | 0 (0) | | | | | | | | | | | | |
| N1087 | 0 (0) | 0 (0) | 0 (0) | | | | | | | | | | | | |
| N1088 | 0 (0) | 0 (0) | 0 (0) | | | | | | | | | | | | |
| N1089 | 0 (0) | 0 (0) | 0 (0) | | | | | | | | | | | | |
| | Order 13 | Order 14 | Order 15 | | | | | | | | | | | | |

ANNEX B

OVERVIEW—THE ACORN GENERATOR

Let k be a finite, strictly positive integer. As described above, the k-th order Additive Congruential Random Number (ACORN) generator is defined by Wikramaratna [1, 2] from an integer modulus M, an integer seed $Y^0_0$ satisfying $0 < Y^0_0 < M$ and an arbitrary set of k integer initial values $Y^m_0$, m=1, ..., k, each satisfying $0 \leq Y^m_0 < M$ by the equations $$Y^0_n = Y^0_{n-1} \quad n \geq 1 \tag{B-1}$$

$$Y^m_n = [Y^{m-1}_n + Y^m_{n-1}]_{mod\, M} \quad n \geq 1,\, m=1, \ldots, k \tag{B-2}$$

where by $[Y]_{mod\, M}$ we mean the remainder on dividing Y by M. In what follows, we will make use of some standard properties of modular arithmetic and congruences; if required, the reader can refer to a textbook on Number Theory for further exposition on these topics. In this Annex we will sometimes use a compressed notation where the use of square brackets around a vector or matrix means that each individual component of the relevant vector or matrix is evaluated and the result taken modulo M.

Finally, the sequence of numbers $Y^k_n$ can be normalised to the unit interval by dividing by M $$X^k_n = Y^k_n / M \quad n \geq 1 \tag{B-3}$$

It turns out that the numbers $X^k_n$ defined by equations (B-1) (B-3) approximate to being uniformly distributed on the unit interval in up to k dimensions, provided a few simple constraints on the initial parameter values are satisfied.

The original implementation proposed in [1] used real arithmetic modulo one, calculating the $X^k_n$ directly. This implementation suffered from a number of conceptual and practical limitations (in particular, the sequences generated with any specific initialisation could not be guaranteed reproducible on different hardware or with different compilers, although the statistical properties of the sequences were unaffected) which could be overcome [2] through the use of the integer implementation based on equations (B-1)-(B-3). Theoretical analysis given by Wikramaratna [2] has shown that the numbers $Y^m_n$ are of the form $$Y^m_n = \left[\sum_{i=0}^{m} Y^i_0 Z^{m-i}_n\right]_{\mod M} \tag{B-4}$$

where for any integer values of a (non-negative) and b (positive) we define $Z^a_b$ by $$Z^a_b = \frac{(a+b-1)!}{a!(b-1)!} \tag{B-5}$$

The following sections of the present Annex are devoted to the development of some relevant background, followed by the statement and proof of a theorem concerning the periodicity of ACORN sequences having arbitrary modulus, where the seed is chosen such that it is relatively prime with the modulus.

The theorem proved in this Annex covers not only cases where the modulus is either a prime number or a prime raised to an integer power, but also extends the result to the general case where the modulus has two or more distinct prime factors, each raised to a (possibly different) integer power.

MATRIX FORMS OF ACORN EQUATIONS

It should be observed that there is more than one way in which the ACORN equations (B-1)-(B-3) can be represented in matrix form. The form that will be adopted in this Annex is particularly well suited to the analysis of periodicity and specifically to the proof of the theorem below. However, it is different from the form of the equations that was adopted in [3] and [4], where the ACORN generator was viewed as a special case of a multiple recursive generator—this required a matrix of size k by k (rather than k+1 by k+1 as in equation (B-7) of this Annex) and different structure and leads to a matrix with different properties. In particular we note that in [3] the resulting matrix turned out to be centro-invertible (which means [4] that its inverse can be found simply by reversing the order of both the rows and columns of the matrix, equivalent to rotating all elements of the matrix through 180° about the mid-point of the matrix). It will be clear from an inspection of equation (B-7) below that this is not the case with the matrix form of the equations that is considered in this Annex.

For any given value of k, define $L_k$ to be the (k+1) by (k+1) lower triangular matrix with all entries equal to 1 both on the diagonal and in the lower triangle, while all entries in the upper triangle are equal to zero. Let $y_n$ be the (k+1) vector with i-th component equal to $[Y^{i-1}_n]$. Equations (B-1) and (B-2) for a k-th order ACORN generator can then be rewritten in matrix form as follows $$y_n = \left([Y^0_n]_{\mod M}, [Y^1_n]_{\mod M}, \ldots, [Y^k_n]_{\mod M}\right)^T = \tag{B-6}$$
$$[L_k y_{n-1}]_{\mod M} = \ldots = [L^n_k y_0]_{\mod M}$$

We observe that for each k the matrix $L_k$ is an inevitable matrix with determinant equal to 1; its inverse is the (k+1) by (k+1) lower triangular matrix with all entries equal to 1 on the diagonal, equal to −1 on the lower "off-diagonal" with unit offset, while all remaining entries in the lower triangle and all entries in the upper triangle are equal to zero. For example, for k=3

$$L_3 = \begin{pmatrix} 1 & 0 & 0 & 0 \\ 1 & 1 & 0 & 0 \\ 1 & 1 & 1 & 0 \\ 1 & 1 & 1 & 1 \end{pmatrix} \quad (L_3)^{-1} = \begin{pmatrix} 1 & 0 & 0 & 0 \\ -1 & 1 & 0 & 0 \\ 0 & -1 & 1 & 0 \\ 0 & 0 & -1 & 1 \end{pmatrix} \tag{B-7}$$

If we write $$[L^n_k]_{\mod M} = (L_{k,\,l,\,p,\,q}{}^n) \tag{B-8}$$

where on the right hand side of this equation the terms $$L^n_{k(p,q)}$$

represent the individual components of the matrix (modulo M), where the indices k and n identify the matrix which is being considered and the power to which it is raised and the subscript terms (p, q) are respectively the row and column indices, each running from 1 to (k+1); then, comparing terms between equations (B-4), (B-6) and (B-8), we obtain $$L^n_{k(p,q)} = 0 \text{ if } p < q \tag{B-9}$$
$$L^n_{k(p,q)} = \left[Z^{n-1}_{p-q+1}\right]_{\mod M} = [Z^{p-q}_n]_{\mod M}$$
$$= \left[\frac{(n+p-q-1)!}{(p-q)!(n-1)!}\right]_{\mod M} \text{ if } p \geq q$$

where the meaning of $Z^a_b$ is as defined previously in equation (B-5). it should be noted that the right hand side of equation (B-9) is a function of (p-q), so that each matrix $(L_k)^n$ is a lower triangular matrix with constant values along the diagonal (equal to 1) and with a (different) constant value along each lower off-diagonal with fixed offset.

PERIOD LENGTH FOR ACORN SEQUENCES

THEOREM 1. Let $X^k_n$ be a k-th order ACORN sequence, defined by equations (B-1)-(B-3), with modulus $$M = \prod_{r=1}^{s} (q_r)^{t_r} \tag{B-10}$$

where each $q_r$ is a prime (ordered such that $q_r < q_{r+1}$), each $t_r$ is a positive integer and suppose that the seed and modulus are chosen to be relatively prime. Then the sequence $X^k_n$, k=1, . . . , n will have a period length equal to $$P = \prod_{r=1}^{s}(q_r)^{i_r} M \qquad \text{(B-11)}$$

where for each r, $i_r$ the largest integer such that $$(q_r)^{i_r} \leq k \qquad \text{(B-12)}$$

Proof

The proof is in two parts.

(i) In the first part it is proved that, provided the seed and modulus are relatively prime, then a necessary and sufficient condition for the period to be N is that $[L_k^N]_{modM}=I$ (where I is the k+1 by k+1 identity matrix) and $[L_k^n]_{modM} \neq I$ for any n<N.

The sufficiency of this condition is obvious: from equation (B-6) we obtain $$y_{N+r}=[L_k^N]_{mod\ M}y_r=Iy_r=y_r \qquad \text{(B-13)}$$

This holds for all r and N is the smallest value for which it holds, which is the definition of the period length.

Necessity is also clear. Suppose (assumption A) that $[L_k^N]_{modM}..I$; we know from (B-9) that $L_{k(1,1)}^N=1$ and there must be at least one other non-zero element in the first column of $[L_k^N]_{modM}$ (if not, this would contradict assumption A—since each lower off-diagonal has constant values).

Suppose that the second non-zero element is in row t, so that $L_{k(t,1)}^N$ is the second non-zero element in the first column of the matrix. From an inspection of equation (B-9) it can be seen that in this case the t-th row of the matrix can have only two non-zero elements; thus if we write $Y^{t-1}_0$ for the t-th element of the vector $y_0$ then in this case the t-th row of the matrix equation (B-6) reduces to $$L_{k(t,t)}^N Y_0^0 + L_{k(t,t)}^N Y_0^{t-1} = Y_0^{t-1} \qquad \text{(B-14)}$$

and since the terms on the diagonal are all equal to 1, this in turn requires $$L_{l(t,t)}^N Y_0^0 = (1-L_{k(t,t)}^N)Y_0^{t-1}=0 \qquad \text{(B-15)}$$

Remembering that this equation must be satisfied modulo and that the seed $Y^0_0$ and the modulus are relatively prime, this equation can only be satisfied if $L_{k(i,1)}^N$ divisible by M and therefore equal to zero modulo M. This contradicts assumption A, proving that the condition $[L_k^N]_{modM}=I$ is necessary.

This completes the first part of the proof.

(ii) In the second part of the proof we will use mathematical induction on the order of the generator, together with the result of the first part of the proof, to prove the theorem.

Consider first the cases where p–q=1 (when k=1 this means that p=2 and q=1)

$$Z^1_n = n \qquad \text{(B-16)}$$

Choosing n=M is the smallest solution with equation (B-16) equal to zero modulo M. Hence the period for a first-order ACORN sequence must be equal to M, provided that the seed and the modulus are relatively prime. This proves the theorem for k=1.

Now suppose that the theorem holds for all k less than or equal to K. Suppose that the period length for the K-th order sequence is $n_K M$. Then the theorem will be proved if we can show that (a) $n_{K+1}$ is equal to $Pn_K$ whenever K+1 is a power of a prime P which is a factor of M; (b) $n_{K+1}$ is equal to $n_K$ whenever K+1 is a power of a prime P which is not a factor of M; (c) $n_{K+1}$ is equal to $n_K$ whenever K+1 is a composite number, ie has two or more different prime factors which may each be raised to any integer power greater than or equal to 1. We will consider each of these cases separately in the relevant, paragraphs below.

We know that (K+1) can be written in the form (K+1)=ab where all the prime factors of a are also prime factors of M and where b and M are relatively prime (and where we allow the possibility that either a or b may be equal to 1; we observe that they cannot both be 1 by the induction hypothesis).

Let T be a positive integer. We can write $$\begin{aligned}Z^{K=1}_{Tn_K M} &= \frac{(Tn_K M + K)!}{(K+1)!(Tn_K M - 1)!} \\ &= \frac{(Tn_K M)(Tn_K M + 1) \ldots (Tn_K M + K)}{(K+1)!} \\ &= \frac{(Tn_K M)}{(K+1)} \frac{(Tn_K M + 1) \ldots (Tn_K M + K)}{K!} \\ &= \frac{(Tn_K M)}{(K+1)}Z^K_{n_K M+1} = \frac{Tn_K M}{a}\frac{Z^K_{n_K M+1}}{b}\end{aligned} \qquad \text{(B-17)}$$

This equation holds for any integer value of T, and clearly still holds if both sides are evaluated modulo M.

(a) Suppose K+1 is a power of a prime, and the prime (which we shall call P) is a factor of M.

By assumption, this requires b=1. By the induction hypothesis, we know that $[Z^K_{n_K M+1}]_{mod\ M} = [Z^K_1]_{mod\ M}=1$ and so in this case equation (B-17), when evaluated modulo M, reduces to $$[Z^{K+1}_{Tn_K M}]_{mod\ M} = \left[\frac{(Tn_K M)}{a}\right]_{mod\ M} \qquad \text{(B-18)}$$

By the induction hypothesis when K+1 is a prime power, $n_K$ is divisible by a/P, but not by a (since K+1=a=$P^t$ for some integer t, the largest power of P less than or equal to K must be $P^{t-1}$=a/P). Hence T=P is the smallest value of T such that equation (B-18) is equal to zero. We have shown that in this case $n_{K+1}$=$Pn_K$, as required for the theorem.

(b) Now suppose K+1 is a power of a prime (which we shall again call P), but the prime is not a factor of the modulus M.

in this case a=1 and b has just a single prime factor raised to some power. Suppose we put z=1 and also set T=1 in equation (B-17)

$$\begin{aligned}Z^{K+1}_{n_K M} &= \frac{(n_K M)}{(K+1)}Z^K_{n_K M+1} \\ &= n_k M\left(\frac{Z^K_{n_K M+1}}{b}\right)\end{aligned} \qquad \text{(B-19)}$$

The left hand side of this equation (B-19) is a binomial coefficient and hence it must be an integer. We know by its definition that b does not have any factors in common with either M or nK, so therefore it follows that the final term in brackets on the right hand side of equation (B-19) must also be an integer. Hence it follows that $$[Z_{n_K M}^{K+1}]_{\mod M} = \left[ n_K M \frac{Z_{n_K M+1}^K}{b} \right]_{\mod M} = 0 \qquad \text{(B-20)}$$

Therefore we have shown that in this case $n_{K+1}=n_K$, as required for the theorem.

(c) Suppose finally that K+1 is not a prime power. Suppose. we set T=1 in equation (B-17), then $$Z_{T n_K M}^{K+1} = \frac{n_K M}{a} \left( \frac{Z_{n_K M+1}^K}{b} \right) \qquad \text{(B-21)}$$

We note that it is possible in (B-21) that either a or b may he equal to 1; however if a=1 then b must be composite and if b=1 then a must be composite (since otherwise K+1 would have only a single prime factor, contradicting the assumption that it is not a prime power). By the induction hypothesis, since K+1 is not a prime power, $n_K$ must clearly be divisible by a. On the other hand, neither $n_K$ nor M can be divisible by b, so by an analogous argument to that used in part (b) above, we require the final term in brackets on the right hand side of equation (B-21) to be an integer. Hence it follows that $$[Z_{T n_K M}^{K+1}]_{\mod M} = \left[ \frac{n_K M}{a} \frac{Z_{n_K M+1}^K}{b} \right]_{\mod M} = 0 \qquad \text{(B-22)}$$

Therefore we have shown that in this case $n_{K+1}=n_K$, as required for the theorem.

Given that the induction hypothesis holds for K, the combination of the cases (a), (b) and (c) proves the induction hypothesis holds for K+1; we have already shown that it holds for K=1 and hence it must hold for all K; this completes the proof of the theorem.

For the special case where the modulus is equal to the product the first s prime numbers greater than 1 there is a simpler way of writing the period length, specified in the theorem by equations (B-11) and (B-12). This is given by the following Corollary 1, where we define $L_k$ to be the least common multiple of the first k integers (in this context we make use of curly brackets to denote the least common multiplier of the numbers contained within them, as in equation (B-23) below)

$$L_k = \{1, 2, \ldots, k\} \qquad \text{(B-23)}$$

Corollary 1. Let $X_n^k$ be a k-th order ACORN sequence, as in Theorem 1, and suppose that the modulus M is equal to the product of the first s prime numbers greater than 1, ie $p_1=2, p_2=3, \ldots p_s$.

$$M = \prod_{i=1}^{s} p_i \qquad \text{(B-24)}$$

Let $L_k$ be the least common multiple of the first k integers, as defined by equation (B-23). Then for any $1 \le k < p_{s+1}$ (where, $p_{s+1}$ is the (s+1)-th prime number greater than 1) the sequence $X_n^k$ will have period length equal to $$P = M L_k \qquad \text{(B-25)}$$

Proof

The conditions of the Corollary 1 satisfy the conditions of Theorem 1 with the added restriction that the primes $q_r$, r= 1, . . . , s defined in the theorem are required to he the first s prime numbers greater than 1, thus $q_r=p_r$ for each r. The Corollary will be proven provided it can be established that $$L_k = \prod_{r=1}^{s} (p_r)^{i_r} \qquad \text{(B-26)}$$

where for each r, $i_r$ the largest integer such that $(p_r)^{i_r} \le k$ \qquad (B-27)

This follows immediately from the definition of the least common multiple of k integers as the smallest number that is divisible by each of those k integers: first, $L_k$ must be divisible by each of the trims in the product on die right hand side of equation (B-26), since by equation (B-27) each such term is an integer less than or equal to k; secondly, every, integer less than or equal to k can be written as a product of powers of the $p_r$, with the power of $p_r$ being less than or equal to the corresponding $i_r$ (since otherwise this would require the integer in question to be greater than k).

REFERENCES

Reference is made in the above to the following, each of which is incorporated herein by reference in its entirety:

1 R. S. Wikramaratna, ACORN—A New Method for Generating Sequences of Uniformly Distributed Pseudorandom Numbers, *J. Comput. Phys.*, 83, pp1 6-31, 1989.

2 R. S. Wikramaratna, Theoretical Background for the ACORN Random Number Generator, Report AEA-APS-0244, AEA Technology, Winfrith, Dorset, UK. 1992.

3 R. S. Wikramaratna, The Additive Congruential Random Number Generator A Special Case of a Multiple Recursive Generator, *J. Comput. and Appl. Mathematics*, 261, pp 371-387, 2008. [doi: 10.1016/j.cam.2007.05.018].

4 R. S. Wikramaratna, The Centro-invertible Matrix: A New Type of Matrix Arising in Pseudo-random Number Generation, *Linear Algebra and its Applications*, 434, pp 144-151, 2011. [doi: 10.1016/j.laa.2010.08.01.11].

The invention claimed is:

1. A computer-implemented method of generating a one-time pad for use in encryption, the method comprising:
   determining, by a processor of a computing system, a seed sequence and an ordered set of initial values;
   computing, by the processor of the computing system, for each initial value, a computed sequence of terms, wherein each term of the computed sequence for each initial value is computed by combining, using modular arithmetic, at least one other term of that computed sequence with at least one term of: i) the computed sequence of an immediately previous initial value or, ii) in the case of a first value of the set of initial values, the seed sequence;
   generating, by the processor of the computing system, a reduced pseudorandom number for each corresponding term of a final sequence computed for a final initial value of the set of initial values, each reduced pseudorandom number having a smaller bit length than the corresponding term of the computed final sequence from which all reduced pseudorandom numbers are generated;

generating, by the processor of the computing system, a sequence of reduced pseudorandom numbers generated for each term of the final sequence;

deriving, by the processor of the computing system, the one-time pad from the sequence of the generated reduced pseudorandom numbers generated for each term of the final sequence; and encrypting or decrypting a sequence of symbols by transforming each symbol of the sequence of symbols with a corresponding element of the one-time pad.

2. The method of claim 1, wherein the generating the reduced pseudorandom number for each term of the final sequence comprises sampling a subset of bits from each term.

3. The method of claim 2, wherein corresponding subset of bits for each term of the final sequence consists of a predetermined number of leading bits, the remaining trailing bits of each term being discarded.

4. The method of claim 3, wherein the deriving the one-time pad by the processor of the computing device comprises:

selectively discarding, by the processor of the computing system, any of the generated reduced pseudorandom numbers which do not match any element of a defined alphabet to generate a reduced sequence of reduced pseudorandom numbers, the alphabet comprising a set of alpha-numeric or other symbols having a length N, wherein: i) the one-time pad is derived from the reduced sequence of reduced pseudorandom numbers, ii) q is a number of elements of the alphabet, iii) p is a predetermined number of leading bits of the corresponding subset of bits for each term of the final sequence, and iv) only the p leading bits of each term of the final sequence are retained, where p=N+Int[log2 q] and N>1.

5. The method of claim 1, wherein the deriving the one-time pad by the processor of the computing device comprises:

selectively discarding, by the processor of the computing system, any of the generated reduced pseudorandom numbers which do not match any element of a defined alphabet to generate a reduced sequence of reduced pseudorandom numbers, wherein the one-time pad is derived from the reduced sequence of reduced pseudorandom numbers.

6. The method of claim 1, wherein at least nine initial values are used, and the modular arithmetic is performed with respect to a modulus of at least $2^{60}$, and preferably at least $2^{90}$, and more preferably at least $2^{120}$.

7. The method of claim 1, wherein the modular arithmetic is performed with respect to a modulus that is a power of two or a power of a prime number other than two or a composite modulus which has two or more different prime factors each of which may be raised to a possibly different power.

8. The method of claim 1, wherein the seed sequence is a repetition of a single seed value, and each term of each sequence for each initial value is computed as a modular sum of an immediately previous term of the same sequence as the term being computed, and a corresponding term to the term being computed of the immediately previous sequence of the term being computed.

9. A computer-implemented method of generating a one-time pad for use in encryption, the method comprising:

determining, by a processor of a computing system, a seed sequence and an ordered set of initial values;

computing, by the processor of the computing system, for each initial value, a computed sequence of terms, wherein each term of the computed sequence for each initial value is computed by combining, using modular arithmetic, at least one other term of that computed sequence with at least one term of: i) the computed sequence of an immediately previous initial value or, ii) in the case of a first value of the set of initial values, the seed sequence; and determining, by the processor of the computing system, a reduced sequence of pseudorandom numbers by selectively discarding terms of a final sequence that do not match any element of a defined alphabet, the final sequence being the sequence computed for a final initial value of the set of initial values;

wherein the one-time pad is derived, by the processor of the computing system, from the reduced sequence of pseudorandom numbers; and encrypting a sequence of symbols by transforming each term of the sequence of symbols with a corresponding component of the one-time pad.

10. The method of claim 9, further comprising:

generating, by the processor of the computing system, a reduced pseudorandom number for each corresponding term of the final sequence, each reduced pseudorandom number having a smaller bit length than the corresponding term of the computed final sequence of terms from which all reduced pseudorandom numbers are generated, wherein the reduced sequence of pseudorandom numbers contains only reduced pseudorandom numbers within the alphabet, with terms of the final sequence whose reduced pseudorandom numbers are outside of the alphabet being discarded.

11. The method of claim 9, wherein at least nine initial values are used, and the modular arithmetic is performed with respect to a modulus of at least $2^{60}$, and preferably at least $2^{90}$, and more preferably at least $2^{120}$.

12. The method of claim 9 wherein the modular arithmetic is performed with respect to a modulus that is a power of two or a power of a prime number other than two or a composite modulus which has two or more different prime factors each of which may be raised to a possibly different power.

13. The method of claim 9, wherein the seed sequence is a repetition of a single seed value, and each term of each sequence for each initial value is computed as a modular sum of a previous term of the same sequence, and a corresponding term of a previous sequence.

14. A system comprising:

one or more processors; and a non-transitory computer readable medium storing a plurality of instructions, which when executed, cause the one or more processors to:

determine a seed sequence and an ordered set of initial values;

compute a sequence of terms for each initial value, wherein each term of the computed sequence for each initial value is computed by combining, using modular arithmetic, at least one other term of that computed sequence with at least one term of: i) the computed sequence of an immediately previous initial value or, ii) in the case of a first value of the set of initial values, the seed sequence;

generate, a reduced pseudorandom number for each corresponding term of a final sequence, computed for a final initial value of the set of initial values, each reduced pseudorandom number having a smaller bit length than the corresponding term of the computed final sequence of terms from which all reduced pseudorandom numbers is are generated;

generate a sequence of the reduced pseudorandom numbers generated for each term of the final sequence;

derive the one-time pad from the sequence of the generated reduced pseudo random numbers generated for each term of the final sequence; and encrypt or decrypt a sequence of symbols by transforming each symbol of the sequence of symbols with a corresponding element of the one-time pad.

15. A computer-implemented method of encrypting or decrypting a sequence of symbols, and the method comprising:

encrypting or decrypting a piece of data in a form of a sequence of symbols by transforming each symbol of the sequence of symbols with a corresponding element of a one-time pad derived from a sequence of reduced pseudo-random numbers, the sequence of reduced pseudo-random numbers being generated by:

determining a seed sequence and an ordered set of initial values;

computing for each initial value, a computed sequence of terms, wherein each term of the computed sequence is computed by combining, using modular arithmetic, at least one other term of that computed sequence with at least one term of: i) the computed sequence of an immediately previous initial value or, ii) in the case of the first value of the set of initial values, the seed sequence; and generating a reduced pseudo-random number for each corresponding term of a final sequence computed for a final initial value of the set of initial values, each reduced pseudo-random number having a smaller bit length than the corresponding term of the final sequence of terms from which all reduced pseudo-random numbers are generated.

16. The method of claim 15, wherein the generating the reduced pseudorandom number for each term of the final sequence comprises sampling a subset of bits from each term.

17. The method of claim 16, wherein corresponding subset of bits for each term of the final sequence consists of a predetermined number of leading bits, the remaining trailing bits of each term being discarded.

18. The method of claim 17, wherein deriving the one-time pad further comprises:

selectively discarding any of the generated reduced pseudorandom numbers which do not match any element of a defined alphabet to generate a reduced sequence of reduced pseudorandom numbers, the alphabet comprising a set of alpha-numeric or other symbols having a length N, wherein: i) the one-time pad is derived from the reduced sequence of reduced pseudorandom numbers, ii) q is a number of elements of the alphabet, iii) p is a predetermined number of leading bits of the corresponding subset of bits for each term of the final sequence, and iv) only the p leading bits of each term of the final sequence are retained, where p=N +Int[log2 q] and N>1.

19. The method of claim 15, wherein deriving the one-time pad further comprises:

selectively discarding any of the generated reduced pseudo-random numbers which do not match any element of a defined alphabet to generate a reduced sequence of reduced pseudo-random numbers, wherein the one-time pad is derived from the reduced sequence of reduced pseudo-random numbers.

20. The method of claim 15, wherein at least nine initial values are used, and the modular arithmetic is performed with respect to a modulus of at least $2^{60}$, and preferably at least $2^{90}$, and more preferably at least $2^{120}$.

21. The method of claim 15, wherein the modular arithmetic is performed with respect to a modulus that is a power of two or a power of a prime number other than two or a composite modulus which has two or more different prime factors each of which may be raised to a possibly different power.

22. The method of claim 15, wherein the seed sequence is a repetition of a single seed value, and each term of each sequence for each initial value is computed as a modular sum of an immediately previous term of the same sequence as the term being computed, and a corresponding term to the term being computed of the immediately previous sequence of the term being computed.

23. A computer-implemented method of encrypting or decrypting a sequence of symbols, the method comprising:

encrypting or decrypting a piece of data in a form of a sequence of symbols by transforming each symbol of the sequence of symbols with a corresponding element of a one-time pad derived from a sequence of reduced pseudo-random numbers, the sequence of reduced pseudo-random numbers being generated by:

determining a seed sequence and an ordered set of initial values;

computing for each initial value, a computed sequence of terms, wherein each term of the computed sequence is computed by combining, using modular arithmetic, at least one other term of that computed sequence with at least one term of: i) the computed sequence of an immediately previous initial value or, ii) in the case of the first value of the set of initial values, the seed sequence; and discarding, selectively, terms of a final sequence that do not match any element of a defined alphabet, the final sequence being the sequence computed for a final initial value of the set of initial values.

24. The method of claim 23, wherein the sequence of reduced pseudo-random numbers is further generated by:

generating for each corresponding term of the final sequence, a reduced pseudo-random number having a smaller bit length than the corresponding term of the final sequence of terms from which the all reduced pseudo-random numbers are generated, wherein the sequence of reduced pseudo-random numbers contains only reduced pseudo-random numbers within the alphabet, with terms of the final sequence whose reduced pseudo-random numbers are outside of the alphabet being discarded.

25. The method of claim 23, wherein at least nine initial values are used, and the modular arithmetic is performed with respect to a modulus of at least $2^{60}$, and preferably at least $2^{90}$, and more preferably at least $2^{120}$.

26. The method of claim 23, wherein the modular arithmetic is performed with respect to a modulus that is a power of two or a power of a prime number other than two or a composite modulus which has two or more different prime factors each of which may be raised to a possibly different power.

27. The method of claim 23, wherein the seed sequence is a repetition of a single seed value, and each term of each sequence for each initial value is computed as a modular sum of a previous term of the same sequence, and a corresponding term of a previous sequence.

* * * * *